United States Patent
Hansen et al.

(10) Patent No.: US 11,524,435 B2
(45) Date of Patent: Dec. 13, 2022

(54) INJECTION MOLDING APPARATUS WITH INTEGRATED ACTUATOR ELECTRONIC DRIVE

(71) Applicant: Synventive Molding Solutions, Inc., Peabody, MA (US)

(72) Inventors: Deven Hansen, Somerville, MA (US); Christopher Lee, Beverly, MA (US); Lin Yang, Lynnfield, MA (US); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

(21) Appl. No.: 17/181,292

(22) Filed: Feb. 22, 2021

(65) Prior Publication Data
US 2021/0170651 A1 Jun. 10, 2021

Related U.S. Application Data

(63) Continuation of application No. PCT/US2020/046736, filed on Aug. 18, 2020.
(Continued)

(51) Int. Cl.
| | | |
|---|---|---|
| *B29C 45/28* | (2006.01) | |
| *B29C 45/27* | (2006.01) | |

(Continued)

(52) U.S. Cl.
CPC ........ *B29C 45/281* (2013.01); *B29C 45/2725* (2013.01); *B29C 45/77* (2013.01);
(Continued)

(58) Field of Classification Search
CPC ............... B29C 45/231; B29C 45/281; B29C 2045/2824
See application file for complete search history.

(56) References Cited

U.S. PATENT DOCUMENTS 8,928,271 B2 1/2015 Bucella et al.
9,048,708 B2 6/2015 Cloran et al.
(Continued)

FOREIGN PATENT DOCUMENTS

| EP | 2926972 A1 | 10/2015 |
| JP | 2004274834 A | 9/2004 |
| WO | 2019089243 A1 | 5/2018 |

OTHER PUBLICATIONS

International Search Report and Written Opinion in related international application PCT/US2020/046736 dated Feb. 3, 2021.
(Continued)

*Primary Examiner* — James Sanders
(74) *Attorney, Agent, or Firm* — Polsinelli, P.C.

(57) ABSTRACT

An injection molding apparatus (10) comprising:
an actuator (940, 941, 942) comprised of a rotor (940r, 941r, 942r) having a drive axis (Y) and a driver (940dr, 941dr, 942dr) receiving electrical energy or power from an electrical drive (940d, 941d, 942d),
the electrical drive (940d, 941d, 942d) comprising an interface that receives and controllably distributes electrical energy or power in controllably varied amounts to the driver (940dr, 941dr, 942dr),
the actuator including a housing (940h, 941h, 942h) within, on or to which the electrical drive (940d, 941d, 942d) is mounted, the housing (940h, 941h, 942h) being mounted in proximity or disposition relative to the heated manifold (40) such that one or the other or both of the housing (940h, 941h, 942h) and the electrical drive (940d, 941d, 942d) are in substantial heat communication or contact with the heated manifold (40).

37 Claims, 16 Drawing Sheets

Related U.S. Application Data

(60) Provisional application No. 62/889,385, filed on Aug. 20, 2019.

(51) Int. Cl.
  *B29C 45/77*  (2006.01)
  *B29C 45/78*  (2006.01)
  *B29C 45/80*  (2006.01)

(52) U.S. Cl.
  CPC .............. *B29C 45/78* (2013.01); *B29C 45/80* (2013.01); *B29C 2045/2824* (2013.01)

(56) References Cited

U.S. PATENT DOCUMENTS

| | | |
|---|---|---|
| 2018/0079121 A1 | 3/2018 | Lee |
| 2018/0186051 A1 | 7/2018 | Lee |

OTHER PUBLICATIONS

Teknic Clear Path Integrated Servo Motors printout from www.teknic.com/products/clearpath-brushless-dc-servo-motors/ from Apr. 29, 2019.

Invitation to Pay Additional Fees and Partial Search Report in related international application PCT/US2020/046736 dated Oct. 15, 2020.

International Preliminary Report on Patentability in related international application PCT/US2020/046736 dated May 6, 2021.

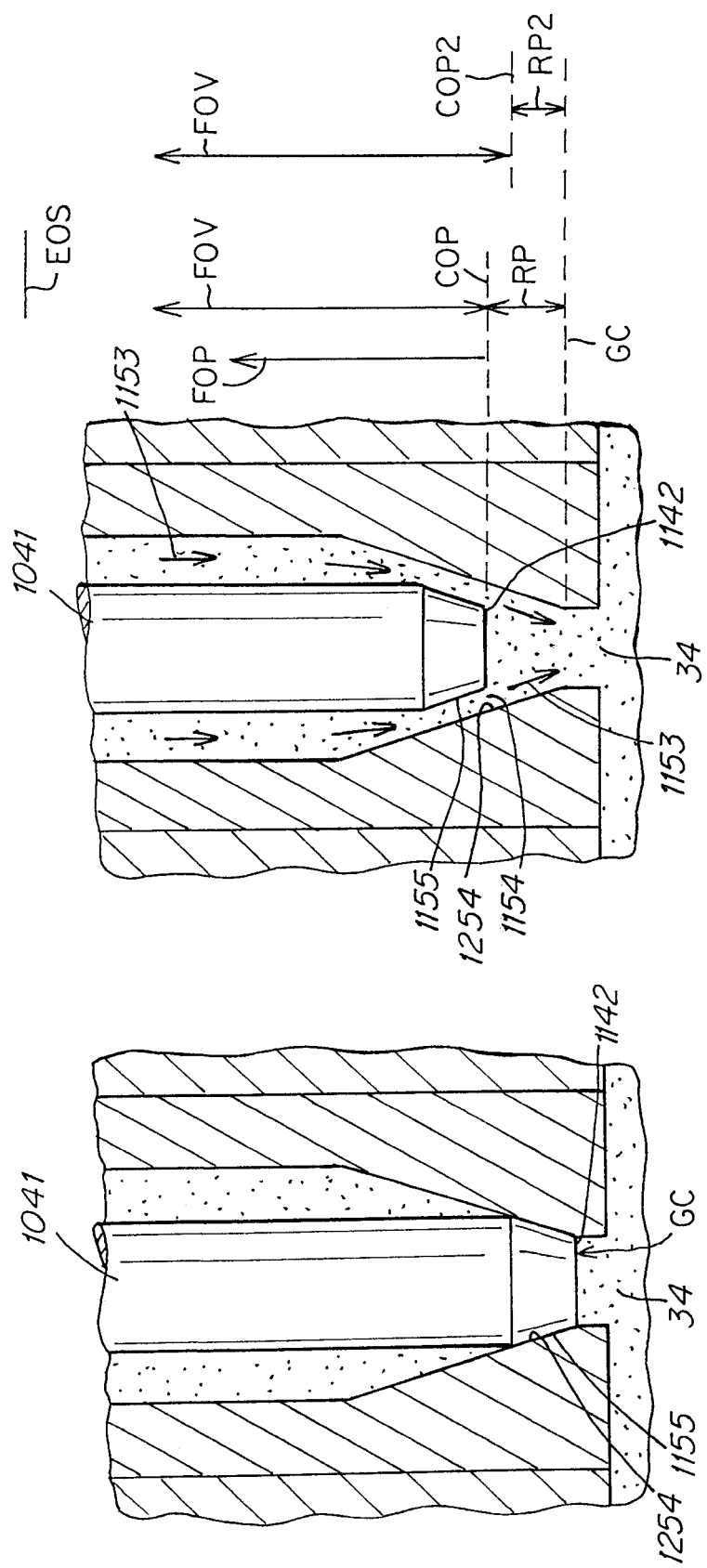

INJECTION MOLDING APPARATUS WITH INTEGRATED ACTUATOR ELECTRONIC DRIVE

RELATED APPLICATIONS

This application is a national stage of PCT/US2020/046736 filed in Aug. 18, 2020, which claims the benefit of priority to U.S. Provisional Application Ser. No. 62/889,385 filed Aug. 20, 2019 the disclosures of which are incorporated by reference as if fully set forth herein in its entirety.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300, 6,419,870, 6,464,909, 6,062,840, 6,261,075, 6,599,116, 7,234,929, 7,419,625, 7,569,169, 8,297,836 U.S. patent application Ser. No. 10/214,118, filed Aug. 8, 2002, U.S. Pat. Nos. 7,029,268, 7,270,537, 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, U.S. application Ser. No. 10/101,278 filed Mar. 19, 2002 and PCT Application No. PCT/US11/062099 and PCT Application No. PCT/US11/062096, U.S. Pat. Nos. 8,562,336, 8,091,202 and 8,282,388, 9,724,861, 9,662,820, Publication No. WO2015006261, Publication No. WO2014209857, Publication No. WO2016153632, International publication no. WO2016153704, U.S. Pat. No. 9,205,587, U.S. application Ser. No. 15/432,175 filed Feb. 14, 2017, U.S. Pat. No. 9,144,929, U.S. Publication No. 20170341283, U.S. Pat. No. 9,937,648, U.S. patent Ser. No. 10/569,458, International Application WO2017214387, International Application PCT/US17/043029 filed Jul. 20, 2017, International Application PCT/US17/043100, filed Jul. 20, 2017 and International Application PCT/US17/036542 filed Jun. 8, 2017 and International Application WO2018129015, International application WO2018148407, International application WO2018148407, international application WO2018175362, international application WO2018194961, international application WO2018200660, international application WO2019013868, international application WO2019100085.

BACKGROUND OF THE INVENTION

Injection molding systems have been developed for performing injection molding cycles controlled by an electric motor actuator mounted for protection from overheating. The electrical drive systems and devices, typically including or containing an electrical interface, pulse-width modulator, inverter, comparator or the like, that are used in such prior systems are mounted in a location or environment in, on or around the system that is relatively cool, insulated or isolated from direct thermal communication or contact with the actuator or with the fluid distribution manifold that is typically heated to exceptionally high or elevated temperatures.

SUMMARY OF THE INVENTION

In accordance with the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (940, 941, 942) comprised of a rotor (940r, 941r, 942r) having a drive axis (Y) and a driver (940dr, 941dr, 942dr) interconnected to the rotor (940r, 941r, 942r) adapted to controllably drive the rotor rotatably around the drive axis, the driver ((940dr, 941dr, 942dr)) receiving electrical energy or power from an electrical drive (940d, 941d, 942d), the electrical drive (940d, 941d, 942d) comprising an interface that receives and controllably distributes electrical energy or power in controllably varied amounts during the course of an injection cycle to the driver (940dr, 941dr, 942dr), the actuator having a housing (940h, 941h, 942h) that houses the electrical drive (940d, 941d, 942d), the rotor (940r, 941r, 942r) and the driver (940dr, 941dr, 942dr), the housing being adapted to support the rotor (940r, 941r, 942r) such that the rotor is drivably rotatable, wherein the housing (940h, 941h, 942h) is mounted in proximity or disposition relative to the heated manifold (40) such that one or the other or both of the housing (940h, 941h, 942h) and the electrical drive (940d, 941d, 942d) is or are in substantial heat communication with the heated manifold (40).

The driver (940dr, 941dr, 942dr) is typically comprised of one or more of a stator and armature that are interconnected to a rotatably mounted rotor or shaft (940r, 941r, 942r) such that when the drivers (940dr, 941dr, 942dr) rotate on application and receipt of electrical energy or power, the shafts (940r, 941r, 942r) are rotated.

The rotor (940r, 941r, 942r) typically has a drive axis (Y), the driver (940dr, 941dr, 942dr) being interconnected to the rotor (940r, 941r, 942r) and adapted to controllably drive the rotor (940r, 941r, 942r) rotatably around the drive axis Y.

The driver (940dr, 941dr, 942dr) typically receives electrical energy or power from the electrical drive (940d, 941d, 942d).

The electrical drive (940d, 941d, 942d) preferably receives electrical energy or power from a power source (PS) and controllably distributes the received electrical energy or power in controllably varied amounts during the course of an injection cycle to the drivers (940dr, 941dr, 942dr).

The actuator typically includes a housing (940h, 941h, 942h) that houses the rotor (940r, 941r, 942r) and the driver (940dr, 941dr, 942dr) and is adapted to support the rotor (940r, 941r, 942r) such that the rotor is drivably rotatable (940rt, 941rt, 942rt).

The housing (940h, 941h, 942h) is typically thermally or heat conductive such that the housing receives heat or thermal energy from the manifold (40), the housing (940h, 941h, 942h) being in thermally conductive communication or contact with the manifold (40).

The electrical drive (940d, 941d, 942d) is housed within or by the housing (940h, 941h, 942h) or is physically mounted on or to the housing (940h, 941h, 942h) in thermally conductive communication or contact therewith.

The housing (940h, 941h, 942h) is preferably mounted in a physical proximity or disposition relative to the heated manifold (40) or in a direct or indirect heat conductive communication or contact with the heated manifold (40) such that one or the other or both of the housing (940h, 941h, 942h) and the electrical drive (940d, 941d, 942d) are in substantial heat or thermal communication or contact with the heated manifold (40).

The housing (940h, 941h, 942h) and the electrical drive (940d, 941d, 942d) can be mounted in a direct heat conductive communication or contact with the heated manifold (40).

The housing (940h, 941h, 942h) and the electrical drive (940d, 941d, 942d) are typically mounted on or to mounts comprised of a metal material that are mounted in direct metal to metal contact or communication with the heated manifold (40).

The electrical drive (940d, 941d, 942d) typically includes a pulse-width modulator (PWM) that converts received electrical energy or power into sinusoidal voltage waveforms, each sinusoidal voltage waveform being adapted to drive a corresponding phase-coil of the actuator driver (940dr, 941dr, 942dr).

The pulse-width modulator (PWM) typically comprises an inverter or a comparator.

The pulse width modulator (PWM) can comprise a three-phase inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the pulse width modulator (PWM) can comprise a DC bus voltage.

The interface of the electrical drive (940d, 941d, 942d) is typically adapted to receive one or more control signals from a controller (16) and to convert electrical energy or power received the power source (PS) into sinusoidal waveforms based on the one or more control signals.

The interface is typically comprised of the pulse width modulator (PWM) which converts electrical energy or power received from the power source into sinusoidal waveforms based on the one or more control signals.

The one or more control signals received by the interface typically contain control information causing the pulse width modulator (PWM) to convert the received electrical energy or power into sinusoidal waveforms adapted to drive the corresponding phase-coils of the actuator driver to adjust one or more of a position, a velocity or a torque of the actuator rotor (940r, 941r, 942r).

The one or more control signals can comprise analog electrical signals received at the electrical drive from the controller (16).

The electrical drive (940d, 941d, 942d) can comprises one or the other or both of a digital signal receiving (16r) and transmitting (16s) device, wherein: the digital signal receiving and transmitting device is adapted to receive and transmit digital signals between the electrical drive (940d, 941d, 942d) and the controller (16) of the injection molding apparatus; and wherein, the digital signals include the one or more control signals, where the one or more control signals are digital control signals received from the controller.

The digital control signals can include one or more of differential position commands, differential current commands, and differential velocity commands.

The digital signal receiving and transmitting device (16r, 16s) is typically adapted to receive digital signals from the actuator, wherein: the digital signals received from the actuator include one or more feedback signals corresponding to operation of one or more of the actuator and the actuator rotor.

The pulse width modulator (PWM) typically converts the electrical energy or power received from the interface into sinusoidal waveforms adapted to drive the corresponding phase-coils of the actuator driver based at least in part on the one or more feedback signals.

The one or more feedback signals received from the actuator can include one or more of an incremental feedback signal and an absolute feedback signal.

The housing (940h, 941h, 942h) of the actuator can be interconnected to a linear travel converter (940l, 941l, 942l) in an arrangement wherein the valve pin (1040, 1041, 1042) is adapted to be driven along a linear axis (X) that is non coaxial relative to the drive axis (y), the linear travel converter (940l, 941l, 942l) being mounted on or to or disposed in heat conductive communication with the heated manifold (40).

The linear travel converter (940l, 941l, 942l) can be mounted on or to one or the other or both of the heated manifold (40) or a clamping plate (80).

The linear travel converter typically includes a converter housing (940lh) mounted in direct or indirect heat conductive contact to the heated manifold (40), the housing (940h, 941h, 942h) being connected to the converter housing (940lh) in thermally conductive contact therewith.

The linear travel converter can include a converter housing (940lh) mounted on or to mounts comprised of a metal material that are mounted in direct metal to metal contact or communication with the heated manifold (40).

The housing (940h, 941h, 942h) is mounted on or to a clamping plate (80) in an arrangement such that one or the other or both of the housing (940h, 941h, 942h) and the electrical drive (940d, 941d, 942d) are in substantial heat or thermal communication with the heated manifold (40).

In another aspect of the invention there is provided an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (940, 941, 942) comprised of a rotor (940r, 941r, 942r) having a drive axis (Y) and a driver (940dr, 941dr, 942dr) interconnected to the rotor (940r, 941r, 942r) adapted to controllably drive the rotor rotatably around the drive axis Y, the driver (940dr, 941dr, 942dr) receiving electrical energy or power from an electrical drive (940d, 941d, 942d), the electrical drive (940d, 941d, 942d) comprising an interface that receives and controllably distributes electrical energy or power in controllably varied amounts during the course of an injection cycle to the driver (940dr, 941dr, 942dr), the actuator including a housing (940h, 941h, 942h) that houses the rotor (940r, 941r, 942r) and the driver (940dr, 941dr, 942dr), the electrical drive (940d, 941d, 942d) being housed within or by the housing (940h, 941h, 942h) or mounted on or to the housing (940h, 941h, 942h) in thermally conductive communication or contact therewith, wherein the housing (940h, 941h, 942h) is mounted in proximity or disposition relative to the heated manifold (40) such that one or the other or both of the housing (940h, 941h, 942h) and the electrical drive (940d, 941d, 942d) is or are in substantial heat communication or contact with the heated manifold (40).

In such an apparatus the electric actuators (940, 941, 942) can comprise a driver (940dr, 941dr, 942dr) comprised of one or more of a stator and armature that are interconnected to a rotatably mounted rotor or shaft (940r, 941r, 942r) such that when the drivers (940dr, 941dr, 942dr) rotate on application and receipt of electrical energy or power, the shafts (940r, 941r, 942r) are rotated.

The rotor (940r, 941r, 942r) typically has a drive axis (Y), the driver (940dr, 941dr, 942dr) being interconnected to the rotor (940r, 941r, 942r) and adapted to controllably drive the rotor (940r, 941r, 942r) rotatably around the drive axis Y.

The driver (940dr, 941dr, 942dr) typically receives electrical energy or power from an electrical drive (940d, 941d, 942d).

The electrical drive (940d, 941d, 942d) can receive electrical energy or power from a power source (PS) and controllably distributes the received electrical energy or power in controllably varied amounts during the course of an injection cycle to the drivers (940dr, 941dr, 942dr).

The housing (940h, 941h, 942h) is typically mounted in a physical proximity or disposition relative to the heated manifold (40) or in a direct or indirect heat conductive communication or contact with the heated manifold (40) such that one or the other or both of the housing (940h, 941h, 942h) and the electrical drive (940d, 941d, 942d) are in substantial heat or thermal communication or contact with the heated manifold (40).

The housing (940h, 941h, 942h) and the electrical drive (940d, 941d, 942d) are preferably mounted in a direct heat conductive communication or contact with the heated manifold (40).

The housing (940h, 941h, 942h) and the electrical drive (940d, 941d, 942d) are typically mounted on or to mounts comprised of a metal material that are mounted in direct metal to metal contact or communication with the heated manifold (40).

The electrical drive (940d, 941d, 942d) includes a pulse-width modulator (PWM) that converts received electrical energy or power into sinusoidal voltage waveforms, each sinusoidal voltage waveform being adapted to drive a corresponding phase-coil of the actuator driver (940dr, 941dr, 942dr).

The pulse-width modulator (PWM) can comprise an inverter or a comparator.

The pulse width modulator (PWM) typically comprise a three-phase inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the pulse width modulator (PWM) can comprise a DC bus voltage.

The interface of the electrical drive (940d, 941d, 942d) is preferably adapted to receive one or more control signals from a controller (16) of the injection molding apparatus and to convert electrical energy or power received the power source (PS) into sinusoidal waveforms based on the one or more control signals.

The interface is preferably comprised of the pulse width modulator (PWM) which converts electrical energy or power received from the power source into sinusoidal waveforms based on the one or more control signals.

The one or more control signals received by the interface typically contain control information causing or instructing the pulse width modulator (PWM) to convert the received electrical energy or power into sinusoidal waveforms adapted to drive the corresponding phase-coils of the actuator driver to adjust one or more of a position, a velocity or torque of the actuator rotor (940r, 941r, 942r).

The one or more control signals can comprise analog electrical signals received at the electrical drive from the controller (16).

The electrical drive (940d, 941d, 942d) can comprise one or the other or both of a digital signal receiving (16r) and transmitting (16s) device, wherein: the digital signal receiving and transmitting device is adapted to receive and transmit digital signals between the electrical drive (940d, 941d, 942d) and the controller (16) of the injection molding apparatus; and wherein, the digital signals include the one or more control signals, where the one or more control signals are digital control signals received from the controller.

The digital control signals typically include one or more of differential position commands, differential current commands, and differential velocity commands.

The digital signal receiving and transmitting device is typically adapted to receive digital signals from the actuator, wherein:

the digital signals received from the actuator include one or more feedback signals corresponding to operation of one or more of the actuator and the actuator rotor; and the pulse width modulator converts the electrical energy or power received from the interface into sinusoidal waveforms adapted to drive the corresponding phase-coils of the actuator driver based at least in part on the one or more feedback signals.

The one or more feedback signals received from the actuator typically include one or more of an incremental feedback signal and an absolute feedback signal.

The housing (940h, 941h, 942h) of the actuator can be interconnected to a linear travel converter (940l, 941l, 942l) in an arrangement wherein the valve pin (1040, 1041, 1042) is adapted to be driven along a linear axis (X) that is non coaxial relative to the drive axis (y), the linear travel converter (940l, 941l, 942l) being mounted on or to or disposed in heat conductive communication with the heated manifold (40).

The linear travel converter (940l, 941l, 942l) is typically mounted on or to one or the other or both of the heated manifold (40) or a clamping plate (80).

The linear travel converter can include a converter housing (940lh) mounted in direct or indirect heat conductive contact to the heated manifold (40), the housing (940h, 941h, 942h) being connected to the converter housing (940lh) in thermally conductive contact therewith.

The linear travel converter typically includes a converter housing (940lh) mounted on or to mounts comprised of a metal material that are mounted in direct metal to metal contact or communication with the heated manifold (40).

The housing (940h, 941h, 942h) can be mounted on or to a clamping plate (80) in an arrangement such that one or the other or both of the housing (940h, 941h, 942h) and the electrical drive (940d, 941d, 942d) are in substantial heat or thermal communication with the heated manifold (40).

In another aspect of the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (940, 941, 942) comprised of a rotor (940r, 941r, 942r) having a drive axis (Y) and a driver (940dr, 941dr, 942dr) interconnected to the rotor (940r, 941r, 942r) adapted to controllably drive the rotor rotatably around the drive axis Y, the driver (940dr, 941dr, 942dr) receiving electrical energy or power from an electrical drive (940d, 941d, 942d), the electrical drive (940d, 941d, 942d) comprising an interface that receives and controllably distributes electrical energy or power in controllably varied amounts during the course of an injection cycle to the driver (940dr, 941dr, 942dr), the electrical drive (940*d*, 941*d*, 942*d*) including a pulse-width modulator (PWM) that converts the received electrical energy or power into sinusoidal voltage waveforms, each sinusoidal voltage waveform being adapted to drive a corresponding phase-coil of the actuator driver (940*dr*, 941*dr*, 942*dr*), the actuator having a housing (940*h*, 941*h*, 942*h*) that houses the rotor (940*r*, 941*r*, 942*r*) and the driver (940*dr*, 941*dr*, 942*dr*), the housing being adapted to support the rotor (940*r*, 941*r*, 942*r*) such that the rotor is drivably rotatable, the electrical drive (940*d*, 941*d*, 942*d*) being housed within or by the housing (940*h*, 941*h*, 942*h*) or being mounted on or to the housing (940*h*, 941*h*, 942*h*), wherein the housing (940*h*, 941*h*, 942*h*) is mounted in proximity or disposition relative to the heated manifold (40) such that one or the other or both of the housing (940*h*, 941*h*, 942*h*) and the electrical drive (940*d*, 941*d*, 942*d*) is or are in substantial heat communication or contact with the heated manifold (40).

The electrical drive (940*d*, 941*d*, 942*d*) preferably receives electrical energy or power from a power source (PS) and controllably distributes the received electrical energy or power in controllably varied amounts during the course of an injection cycle to the drivers (940*dr*, 941*dr*, 942*dr*).

In such an apparatus the pulse-width modulator (PWM) can comprise an inverter or a comparator.

The pulse width modulator (PWM) can comprise a three-phase inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the pulse width modulator (PWM) typically comprises a DC bus voltage.

The interface of the electrical drive (940*d*, 941*d*, 942*d*) is preferably adapted to receive one or more control signals from a controller (16) of the injection molding apparatus and to convert electrical energy or power received the power source (PS) into sinusoidal waveforms based on the one or more control signals.

The interface is typically comprised of the pulse width modulator (PWM) which converts electrical energy or power received from the power source into sinusoidal waveforms based on the one or more control signals.

The one or more control signals received by the interface can contain control information causing the pulse width modulator (PWM) to convert the received electrical energy or power into sinusoidal waveforms adapted to drive the corresponding phase-coils of the actuator driver to adjust one or more of a position, a velocity or torque of the actuator rotor (940*r*, 941*r*, 942*r*).

The one or more control signals can comprise analog electrical signals received at the electrical drive from the controller (16).

The electrical drive (940*d*, 941*d*, 942*d*) typically comprises one or the other or both of a digital signal receiving (16*r*) and transmitting (16*s*) device, wherein: the digital signal receiving and transmitting device is adapted to receive and transmit digital signals between the electrical drive (940*d*, 941*d*, 942*d*) and the controller (16) of the injection molding apparatus; and wherein, the digital signals include the one or more control signals, where the one or more control signals are digital control signals received from the controller.

The digital control signals can include one or more of differential position commands, differential current commands, and differential velocity commands.

The digital signal receiving and transmitting device can be adapted to receive digital signals from the actuator, wherein: the digital signals received from the actuator include one or more feedback signals corresponding to operation of one or more of the actuator and the actuator rotor; and the pulse width modulator converts the electrical energy or power received from the interface into sinusoidal waveforms adapted to drive the corresponding phase-coils of the actuator driver based at least in part on the one or more feedback signals.

The one or more feedback signals received from the actuator typically includes one or more of an incremental feedback signal and an absolute feedback signal.

The housing (940*h*, 941*h*, 942*h*) and the electrical drive (940*d*, 941*d*, 942*d*) can be mounted in a direct heat conductive communication or contact with the heated manifold (40).

The housing (940*h*, 941*h*, 942*h*) and the electrical drive (940*d*, 941*d*, 942*d*) can be mounted on or to mounts comprised of a metal material that are mounted in direct metal to metal contact or communication with the heated manifold (40).

The housing (940*h*, 941*h*, 942*h*) of the actuator can be interconnected to a linear travel converter (940*l*, 941*l*, 942*l*) that converts rotary motion of the rotor of the actuator to linear motion of the valve pin, the linear travel converter and the actuator being arranged such that the valve pin (1040, 1041, 1042) is adapted to be driven along a linear axis (X) that is non coaxial relative to the drive axis (y), the linear travel converter (940*l*, 941*l*, 942*l*) being mounted on or to or disposed in heat conductive communication with the heated manifold (40).

The linear travel converter (940*l*, 941*l*, 942*l*) is typically mounted on or to one or the other or both of the heated manifold (40) or a clamping plate (80).

The housing (940*h*, 941*h*, 942*h*) is typically mounted on or to a clamping plate (80) in an arrangement such that one or the other or both of the housing (940*h*, 941*h*, 942*h*) and the electrical drive (940*d*, 941*d*, 942*d*) are in substantial heat or thermal communication with the heated manifold (40).

Such an apparatus can further comprising a mount (2000) comprised of a thermally conductive material having first (2000*is*) and second (2000*ms*) heat conductive surfaces disposed between the clamping plate (80) and the actuator housing (940*h*), a surface (940*ls*) of the actuator housing (940*h*) being mounted in thermal communication or contact with the first heat conductive surface (2000*is*) and a surface (80*ms*) of the clamping plate (80) being mounted in thermal communication or contact with the second conductive surface (2000*ms*), wherein the second conductive surface (2000*ms*) of the mount (20000) is adapted to be urged into compressed (dsf) thermally conductive contact or communication with the surface (80*ms*) of the clamping plate (80).

In such an apparatus the mount (2000) can include a resiliently compressible spring (2002) disposed between the actuator housing (940*h*) and the clamping plate (80) that is adapted to urge (dsf) the surface (2000*ms*) of the mount (2000) into compressed thermally conductive contact or communication with the surface (80*ms*) of the clamping plate (80).

The spring (2002) typically comprises one or more resiliently compressible arms (2002*a*) that are resiliently bendable 2002*j*) and have an actuator engagement surface (2002*us*) adapted to engage a complementary surface (940*us*) of the actuator housing (940*h*), the spring (2002), the mount (2000) and the clamping plate being arranged such that the resiliently compressible arms (2002*a*) bend when the actuator housing (940*h*), mount (2000) and clamping plate (80) are assembled and the manifold (40) brought to operating temperature to cause the actuator engagement surface (2002*us*) to compressibly engage (USF) the complementary surface (940*us*) and to urge the surface (2000*ms*) of the mount (2000) into compressed (dsf) thermally conductive contact or communication with the surface (80*ms*) of the clamping plate (80).

Any of the foregoing described apparatuses can further comprise a signal converter (1500) for converting signals generated by an injection molding apparatus (10) that is comprised of an injection molding machine (IMM) having a drivably rotatable barrel screw (BS) that generates an injection fluid (18), a heated manifold (40) that receives an injection fluid (18) from the injection molding machine (IMM) and distributes the injection fluid (18) to one or more gates (32, 34, 36), a mold (42) having a cavity (30) communicating with the gates to receive the injection fluid (18), wherein the injection molding machine (IMM) includes a machine controller (MC) or a control unit (HPU) that generates one or more directional control valve compatible signals (VPS), wherein the direction control valve compatible signals (VPS) are compatible for use by a signal receptor, interface or driver of a standard fluid directional control valve (12) to instruct the fluid directional control valve (12) to move to a position that routes a source of drive fluid to flow in a direction that drives an interconnected fluid drivable actuator (940*f*, 941*f*, 942*f*) to move in a direction that operates to begin an injection cycle and to move in a direction that operates to end an injection cycle, wherein the signal converter (1500) is interconnected to the machine controller (MC) or control unit (HPU), the signal converter (1500) receiving and converting the directional control valve compatible signals (VPS) to a command signal (MOPCS, PDCVS) that is compatible with a signal receptor or interface of an electrically powered actuator (940*e*, 941*e*, 942*e*) or a signal receptor or interface of a proportional directional control valve (V, V1, V2) that drives a fluid driven actuator (940*p*, 941*p*, 942*p*), wherein the signal converter (1500) includes a processor that converts the command signals (MOPCS, PDCVS) into a form, frequency, power or format that is usable by the signal receptor or interface of the electrically powered actuator (940*e*, 941*e*, 942*e*) or by the signal receptor or interface of the proportional directional control valve (V, V1, V2) to respectively cause the electrically powered actuator (940*e*, 941*e*, 942*e*) or the proportional directional control valve (V, V1, V2) to be driven in a direction that operates to either begin an injection cycle or to end an injection cycle.

The directional control valve compatible signals (VPS) comprise a voltage signal of predetermined voltage or magnitude indicative of a predetermined rotational position of the barrel screw (BS) of the injection molding machine (IMM) that generates pressurized injection fluid (18) within the apparatus.

Such signal converter containing apparatus (10) preferably further comprises one or more sensors (950, 951, 952, SN, SC, SPSR, BPSR) that detect and generate one or more sensor signals indicative of one or more of rotational or linear position of an actuator (940*e*, 941*e*, 942*e*, 940*p*, 941*p*, 942*p*) or its associated valve pin (1040, 1041, 1042), pressure or temperature of the injection fluid 18 within a fluid channel (19) of the manifold (40) or within a nozzle channel (42, 44, 46) or within the cavity (30) of the mold (33) or within a barrel of the injection molding machine (IMM), the apparatus (10) including an actuator controller (16) that receives and uses the one or more sensor signals in a program that:

instructs the actuator (940*e*, 941*e*, 942*e*, 940*p*, 941*p*, 942*p*) or its associated valve pin (1040, 1041, 1042) to travel during the course of the injection cycle to positions that correspond to a predetermined profile of injection fluid pressures, linear or rotational pin positions, linear actuator or valve pin positions, barrel screw positions, barrel pressures or actuator drive fluid pressures or that, instructs the actuator (940*e*, 941*e*, 942*e*, 940*p*, 941*p*, 942*p*) or its associated valve pin (1040, 1041, 1042) such that the valve pin is withdrawn from a closed gate position upstream at a reduced velocity over a selected path of upstream travel, or that, instructs the actuator (940*e*, 941*e*, 942*e*, 940*p*, 941*p*, 942*p*) or its associated valve pin (1040, 1041, 1042) to travel such that the valve pin is driven downstream at a reduced velocity over a selected path of travel where a distal tip end of the pin travel from upstream of the gate to a gate closed position, or that, instructs the actuator (940*e*, 941*e*, 942*e*, 940*p*, 941*p*, 942*p*) or its associated valve pin (1040, 1041, 1042) to travel such that the valve pin is driven upstream or downstream to an intermediate position between a gate closed position and a fully upstream position where the valve pin is maintained in the intermediate position for a selected period of time during the course of the injection cycle wherein, in the intermediate position, the distal tip end of the valve pin restricts flow of injection of the injection to less than a maximum flow.

In another aspect of the invention, one or more actuators of an apparatus as described herein can be interconnected to a valve pin having a tip end, the one or more actuators moving the valve pin upstream along a path of travel between a downstream gate closed position and one or more intermediate upstream gate open positions, the downstream gate closed position being a position wherein the tip end of the valve pin obstructs the gate to prevent fluid material from flowing into the mold cavity, the one or more intermediate upstream gate open positions being predetermined positions between the downstream gate closed position and an end of stroke position (EOS) upstream of the intermediate upstream gate open positions, wherein the gate is partially open when the valve pin is in the one or more intermediate upstream gate open positions and the gate is more fully open when the valve pin is in the end of stroke position. Such apparatuses can include:

a position sensor that senses position of the valve pin or the actuator, wherein the controller that is interconnected to the actuator and to the position sensor includes instructions that instruct the actuator to drive the valve pin:

upstream at one or more selected intermediate velocities over the course of travel of the valve pin through the one or more intermediate upstream gate open positions in response to receipt by the controller of a signal from the position sensor that the valve pin is disposed in the one or more intermediate upstream gate open positions, upstream at a higher upstream velocity than the one or more selected intermediate velocities during the course of upstream travel of the valve pin between the one or more intermediate upstream gate open positions and the end of stroke position.

In such an apparatus, the apparatus preferably includes first and second actuators (940, 941) interconnected to first and second valve pins respectively (1040, 1041) having a tip end (1142, 155), the second actuator (941) sequentially moving the second valve pin (1041) upstream along a path of travel (RP, RP2) between a downstream gate closed position (GC), one or more intermediate upstream gate open positions (COP, COP2) and an end of stroke position at which the fluid mold material (18, NM, 100*b*) flows at a selected maximum rate through the gate, the downstream gate closed position being a position wherein the tip end of the valve pin obstructs the gate (32, 34) to prevent fluid material from flowing into the mold cavity, the one or more intermediate upstream gate open positions (COP, COP2) being predetermined positions between the downstream gate closed position (GC) and the end of stroke position (EOS), a selected position sensor (951) that senses position of the second valve pin (1041) or the second actuator (941), the controller (16) interconnected to the second actuator (941) and to the position sensor (951) controlling movement of the second actuator (941) at least in part according to instructions that instruct the second actuator (941) to open the second gate (34) after fluid material (100*p*) injected through the first gate (32) has flowed downstream through the cavity (30) and to drive the second valve pin (1041) upstream at one or more selected intermediate velocities over the course of travel of the second valve pin (1041) through the one or more intermediate upstream gate open positions (COP, COP2) in response to a signal from the position sensor (951) that the second valve pin (1041) is disposed in the one or more intermediate upstream gate open positions and to drive the second valve pin (1041) at a higher velocity than the one or more selected intermediate velocities in response a signal from the position sensor (951) that the second valve pin is disposed in a predetermined intermediate upstream gate open position (COP, COP2).

In such an apparatus the controller (16) typically includes instructions that instruct the second actuator (941) to open the second gate (34) after the fluid material (100*p*) injected through the first gate (32) has flowed downstream through the cavity (30) past the second gate (34).

In another aspect of the invention there is provided a method of performing an injection molding cycle comprising operating any of the apparatuses described herein to perform an injection cycle.

BRIEF DESCRIPTION OF THE DRAWINGS

The accompanying drawings contain numbering of components and devices that correspond to the numbering appearing in the following Summary.

FIGS. 14A-14B show tapered end valve pin positions at various times and positions between a starting closed position as in FIG. 14A and various upstream opened positions, RP representing a selectable path length over which the velocity of withdrawal of the pin upstream from the gate closed position to an open position is reduced relative to the velocity of upstream movement that the valve pin would normally have over the uncontrolled velocity path FOV when pin velocity is at its maximum;

DETAILED DESCRIPTION OF THE INVENTION

Figure 1:
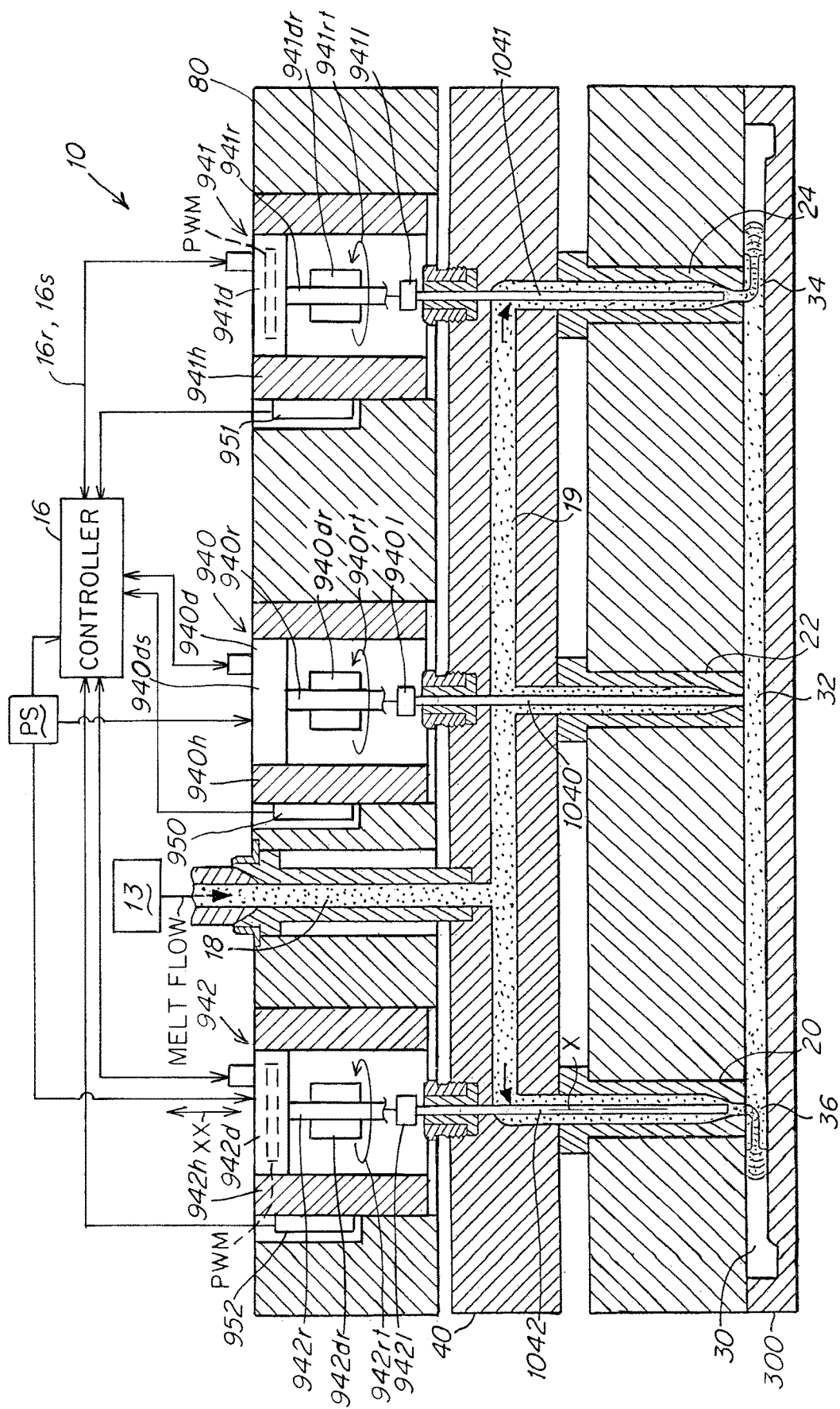
FIG. 1 is a side schematic view of an injection molding apparatus having a center valve with associated actuator (940) and two downstream valves with associated actuators (941, 942) that are opened to a mold cavity in a predetermined sequence after the center valve is first opened, the actuators (940, 941, 942) each comprising an electric motor having an electric drive (940*d*, 941*d*, 942*d*) that is incorporated into or physically onto the housing (940*h*, 941*h*, 942*h*) of the actuator such that the electric drive (940*d*, 941*d*, 942*d*) is in direct thermal communication with the housing (940*h*, 941*h*, 942*h*) of the actuator, the housings of each of the actuators (940, 941, 942) being mounted on or to or in close physical proximity to or in direct thermal communication with a heated manifold.
Figure 1A:
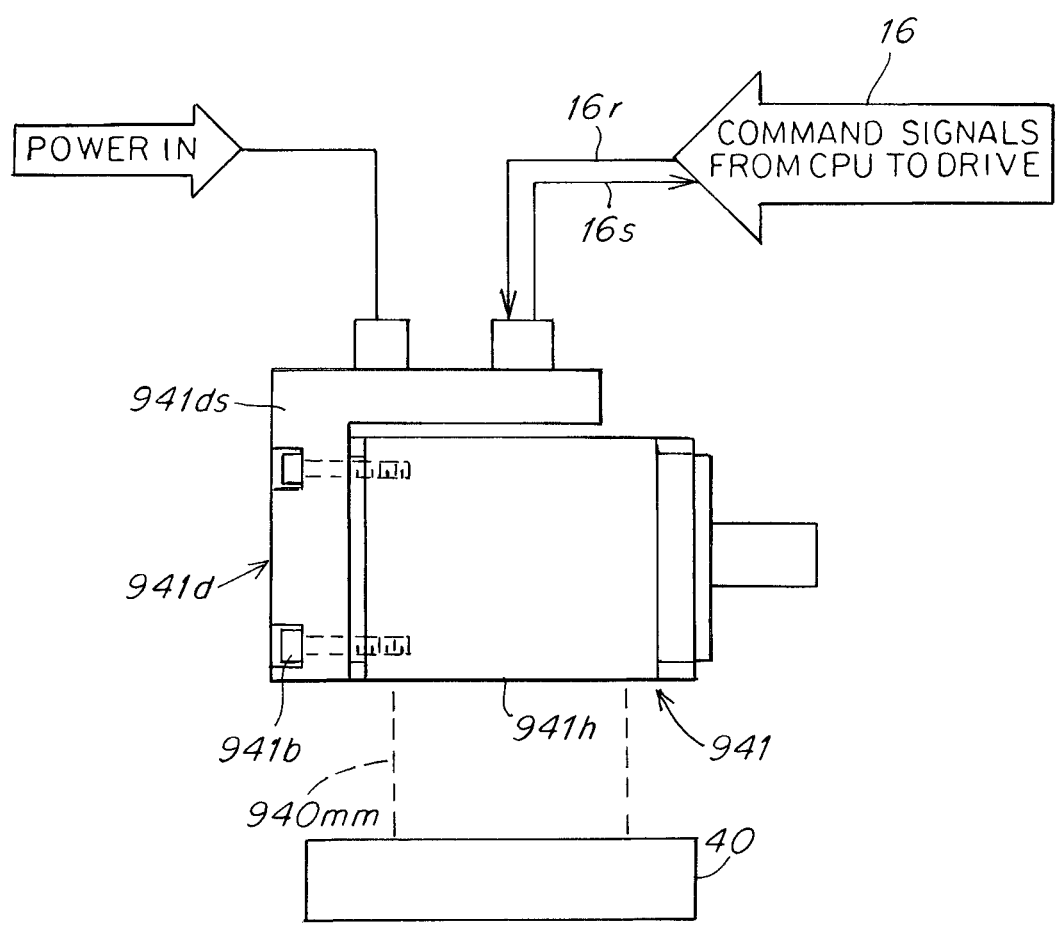
FIG. 1A is a side schematic view of an electric actuator (941) comprised of a housing (941*h*) and an electric drive (941*d*) that is readily attachable to and detachable from the housing (941*h*) of the actuator via a conventional attachment and detachment mechanism such as bolts (941*b*).

FIG. 1 shows an injection molding apparatus having a center valve with associated actuator (940) and two downstream valves with associated actuators (941, 942) that are opened to a mold cavity 30 in a predetermined sequence as described herein after the center valve is first opened, the actuators (940, 941, 942) each comprising an electric motor having an electric drive (940*d*, 941*d*, 942*d*). The electric drive (940*d*, 941*d*, 942*d*) can be housed within the same housing (940*h*, 941*h*, 942*h*) as the driver components of the electric actuator (940, 941, 941), or the electric drive (940*d*, 941*d*, 942*d*) can be housed within a physically separate thermally conductive housing (941*ds*) such as shown in FIG. 1A that is readily attachable to and detachable from the housing (941*h*) that houses the driver components (stator, armature) and rotor component of the electric actuator via conventional device such as bolts, screws, clamps, magnets or the like (941*b*). As shown in FIG. 1A, the thermally conductive housing (941*ds*) is disposed in substantial thermally conductive communication or contact with the heated manifold (40) via the thermally conductive mounting of the thermally conductive housing (941*ds*) to the actuator housing (940*h*) which is in turn mounted via mount device (940*mm*) in substantial heat or thermally conductive communication or contact with the heated manifold (40).

As shown in all of the embodiments of FIGS. 1, 1A, 2, 3, 4, 5, 6, 7, 8, 10, 11, 12, the electric drive (940*d*, 941*d*, 942*d*) is mounted on or to the actuator housing (940*h*, 941*h*, 942*h*) in some manner such that the drive components such as a Pulse Width Modulator (PWM) and associated electrical components are disposed in substantial heat communication or contact with the actuator housing (940*h*, 941*h*, 942*h*) or the heated manifold (40).

Figure 13A:
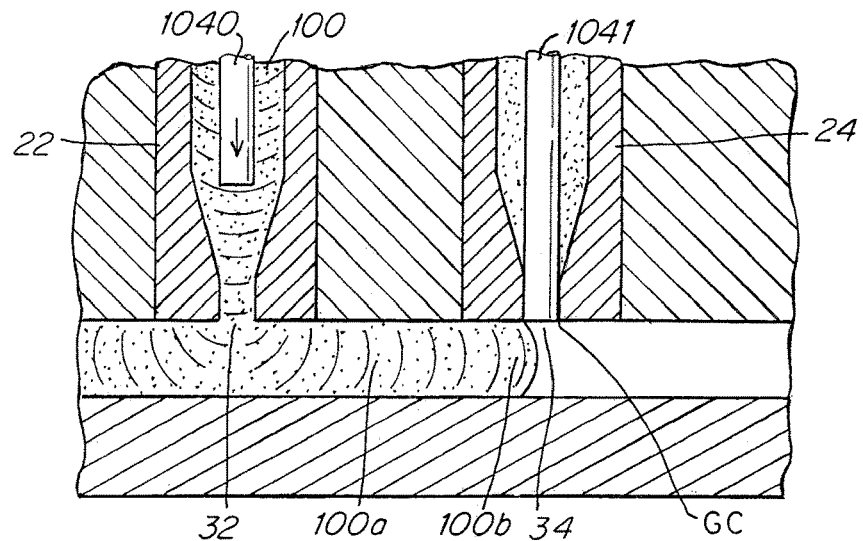
FIGS. 13A-13E are schematic cross-sectional close-up views of the center and one of the lateral gates 34 of the FIG. 1 apparatus showing various stages of the progress of sequential injection.
Figure 13B:
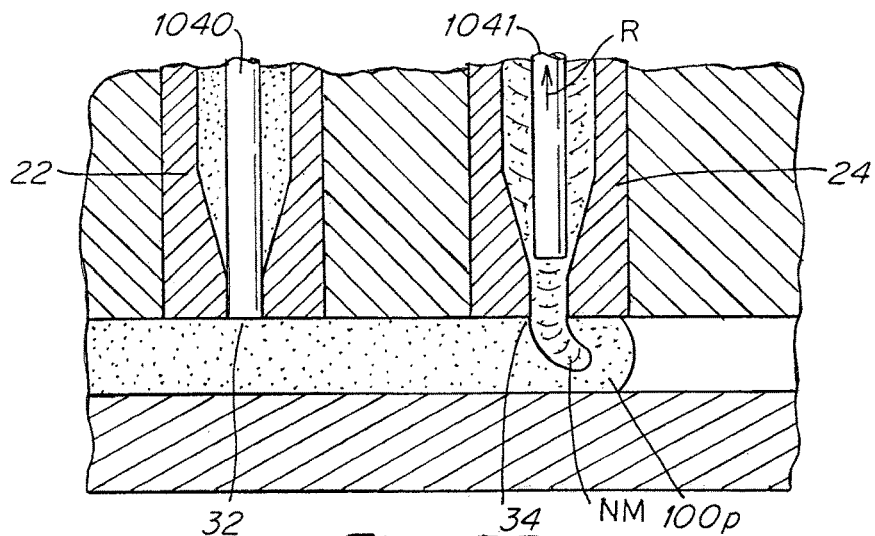
Figure 13C:
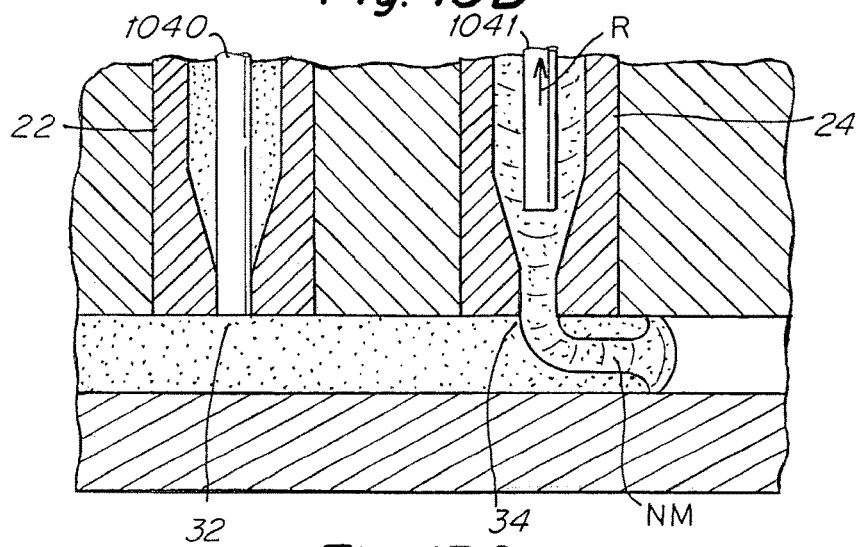

As shown in FIGS. 1, 13A-13E the injection cycle is a cascade process where injection is effected in a sequence from the center nozzle 22 first and at a later predetermined time from the lateral nozzles 20, 24. As shown in FIG. 13A the injection cycle is started by first opening the pin 1040 of the center nozzle 22 and allowing the fluid material 100 (typically polymer or plastic material) to flow up to a position 100*a* in the cavity just before 100*b* the distally disposed entrance into the cavity 34, 36 of the gates of the lateral nozzles 24, 20 as shown in FIG. 1. After an injection cycle is begun, the gate of the center injection nozzle 22 and pin 1040 is typically left open only for so long as to allow the fluid material 100*b* to travel to a position 100*p* just past the positions 34, 36. Once the fluid material has travelled just past 100*p* of the lateral gate positions 34, 36, the center gate 32 of the center nozzle 22 is typically closed by pin 1040 as shown in FIGS. 13B, 13C, 13D and 13E. The lateral gates 34, 36 are then opened by upstream withdrawal of lateral nozzle pins 1041, 1042 as shown in FIGS. 13B-13E. As described below, the rate of upstream withdrawal or travel velocity of lateral pins 1041, 1042 can be controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material NM is allowed to first enter the mold cavity into the stream 102*p* that has been injected from center nozzle 22 past gates 34, 36, the two streams NM and 102*p* mix with each other. If the velocity of the fluid material NM is too high, such as often occurs when the flow velocity of injection fluid material through gates 34, 36 is at maximum, a visible line or defect in the mixing of the two streams 102*p* and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102*p*, the appearance of a visible line or defect in the final molded product can be reduced or eliminated.

The rate or velocity of upstream withdrawal of pins 1041, 1042 starting from the closed position is controlled via controller 16 which controls the rate and direction of drive of the electric actuators 940, 941, 942.

The user programs controller 16 via data inputs on a user interface to instruct the electric actuators to drive pins 1041, 1042 at an upstream velocity of travel that is reduced relative to a maximum velocity that the actuators can drive the pins 1041, 1042 to travel. Such reduced pin withdrawal rate or velocity is executed until a position sensor such as 951, 952 detects that an actuator 941, 952 or an associated valve pin (or another component), has reached a certain position such as the end point COP, COP2, FIGS. 14B, 15B of a restricted flow path RP, RP2. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

Figure 13D:
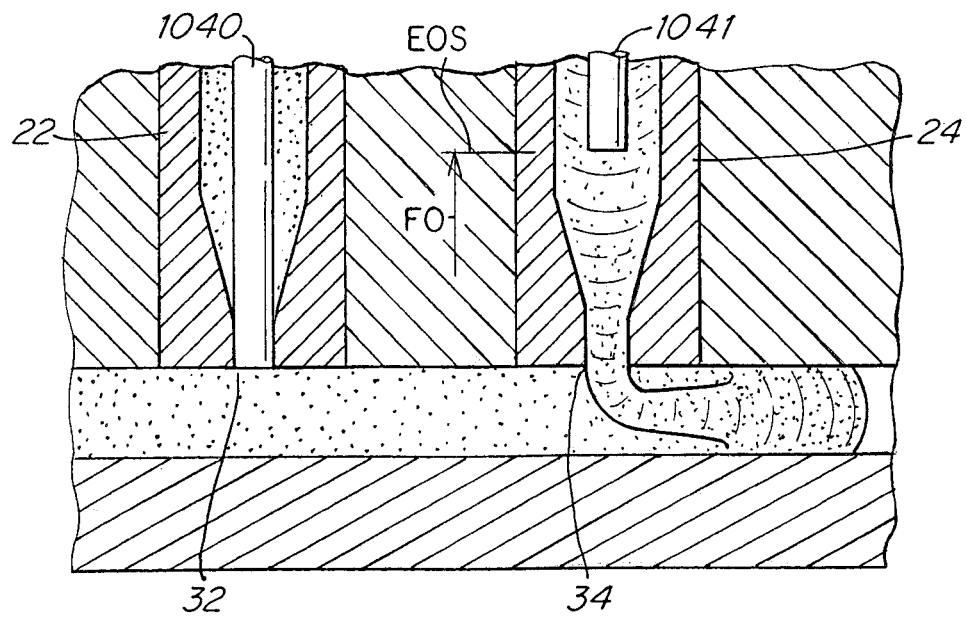
Figure 13E:
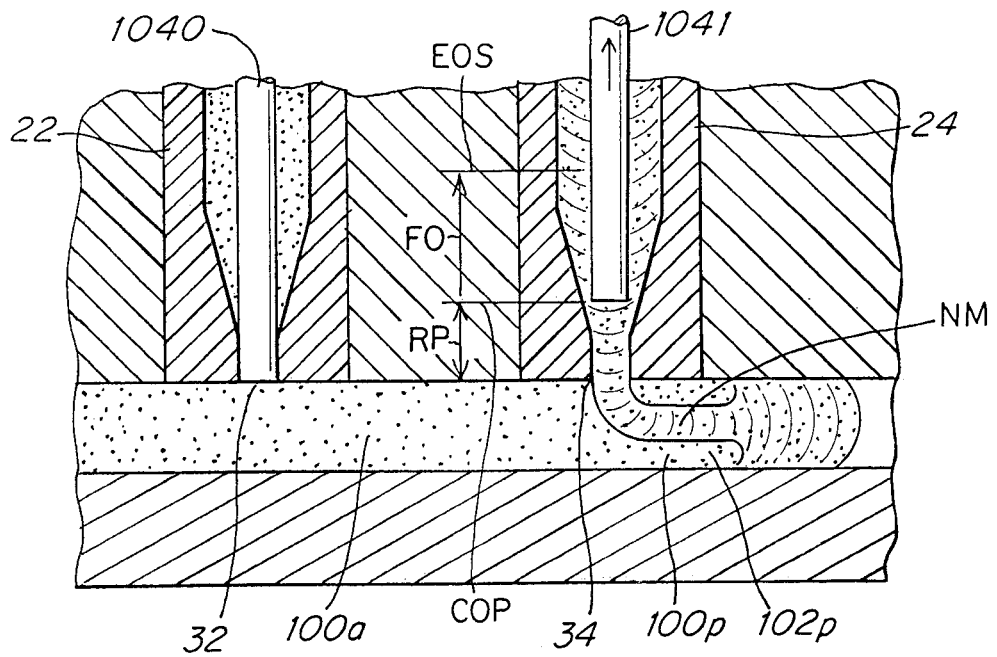

FIG. 1 shows position sensors 950, 951, 952 for sensing the position of the motors 940, 941, 942 and their associated valve pins (such as 1040, 1041, 1042) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36. When the pins 1041, 1042 are withdrawn upstream to a position where the tip end of the pins 1041 are in a fully upstream open position such as shown in FIG. 13D, the rate of flow of fluid material through the gates 34, 36 is at a maximum. However when the pins 1041, 1042 are initially withdrawn beginning from the closed gate position, FIG. 13A, to intermediate upstream positions, FIGS. 13B, 13C, a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 1, 13B, 13C, 13E and 14B, 15B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 14B, 15B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically about 2-6 mm, more typically 2-4 mm and even more typically 1-3 mm in length. According to the invention, the position of the electric actuators are adjusted in response to sensing of position of a suitable component such as the rotor of an actuator 941, 942 or associated valve pin to less than 100% open. Adjustment of the drive of an actuator 931, 942 thus reduces the velocity of upstream travel of the pins 1041, 1042 for the selected period of time. At the end of the travel or length of path RP, RP2, a position sensor signals the controller 16, the controller 16 determines that the end COP, COP2 has been reached and the valve pin is driven at higher velocity, typically to its end of stroke (EOS) or its 100% open position to allow the actuator pistons and the valve pins 1041, 1042 to be driven at maximum upstream velocity FOV in order to reduce the cycle time of the injection cycle.

Typically the user selects one or more reduced velocities that are less than about 90% of the maximum velocity (namely velocity when the valve 600 is fully open), more typically less than about 75% of the maximum velocity and even more typically less than about 50% of the maximum velocity at which the pins 1041, 1042 are drivable by the electric actuator apparatus. The actual maximum velocity at which the actuators 941, 942 and their associated pins 1041, 1042 are driven is predetermined by selection of the size and configuration of the actuators 941, 942. The maximum drive rate of the electric actuator apparatus is predetermined by the manufacturer and the user of the apparatus and is typically selected according to the application, size and nature of the mold and the injection molded part to be fabricated.

Figures 15A, 15B:
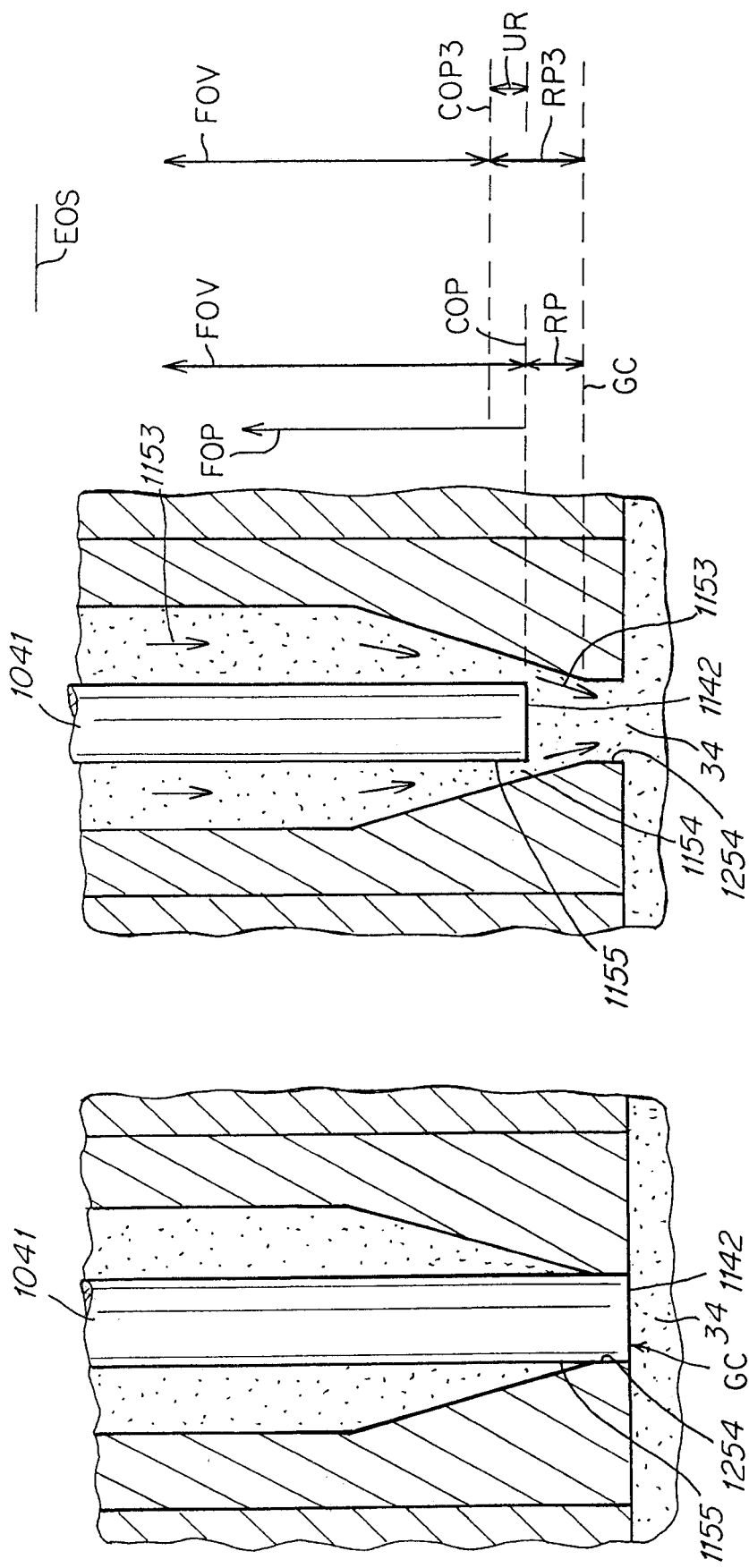
FIGS. 15A-15B show a apparatus having a valve pin that has a cylindrically configured tip end, the tips ends of the pins being positioned at various times and positions between a starting closed position as in FIG. 15A and various upstream opened positions, RP wherein RP represents a path of selectable length over which the velocity of withdrawal of the pin upstream from the gate closed position to an open position is reduced relative to the velocity of upstream movement that the valve pin would normally have over the uncontrolled velocity path FOV when the pin velocity is at its maximum.

Preferably, the valve pin and the gate are configured or adapted to cooperate with each other to restrict and vary the rate of flow of fluid material 1153, FIGS. 14A-14B, 15A-15B over the course of travel of the tip end of the valve pin through the restricted velocity path RP. Most typically as shown in FIGS. 14A, 14B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 15A, 15B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP.

In one embodiment, as the tip end 1142 of the pin 1041 continues to travel upstream from the gate closed GC position (as shown for example in FIGS. 14A, 15A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), where the pin is no longer restricting flow of injection mold material through the gate. In such an embodiment, at the expiration of the predetermined amount of time when the pin tip 1142 reaches the FOP (full open) position the pin 1041 is immediately driven by at maximum velocity FOV (full open velocity). In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV.

In the alternative examples shown in the FIGS. 14B, 15B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 14B the maximum fluid flow rate for injection material 1153 is reached at the upstream position COP of the tip end 1142. In another example shown in FIG. 14B, 15B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection molding apparatus. In this FIG. 4B example the velocity or drive rate of the pin 1041 is not changed over until the tip end of the pin 1041 or actuator 941 has reached the change-over position COP3. As in other embodiments, a position sensor senses either that the valve pin 1041 or an associated component has travelled the path length RP3 or reached the end COP3 of the selected path length and the controller receives and processes such information and instructs the drive apparatus to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 being programmed to instruct the drive system for the actuator to be driven at one or more reduced velocities for the time or path length of an entire closed GC to fully open EOS cycle.

Typically, when the time period for driving the pin 1041 at reduced velocity has expired and the pin tip 1142 has reached the position COP, COP2, the pins 1041, 1042 are driven at the maximum velocity or rate of travel that the actuator system is capable of driving the valve pins 1041, 1042. Alternatively, the pins 1041, 1042 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The end-of-stroke position EOS is an upstream position selected by the user that can be the maximum upstream position that the pin can be withdrawn to or the EOS position can be a less than maximum upstream position to which the valve pin can be withdrawn. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

As shown in each of the embodiments shown in FIGS. 1-8, 10-12 the electrical drive (940d, 941d, 942d) is incorporated into, housed within, or physically mounted onto or in direct heat communication with the actuator housing (940h, 941h, 942h) of the actuator such that the electric drive (940d, 941d, 942d) is in direct thermal communication or contact with the thermally conductive housing (940h, 941h, 942h) of the actuator.

The electrical drive (940d, 941d, 942d) can be housed or mounted in a thermally conductive housing body (940ds) that is readily attachable to and detachable from the actuator housing (940h, 941h, 942h) as shown in FIGS. 1, 4, 5, 7, such a readily attachable and detachable housing body (940ds) being attachable or mountable to the actuator housing (940h, 941h, 942h) in an arrangement such that the electrical drive (940d, 941d, 942d) is in direct thermally conductive contact or communication with the actuator housing (940h, 941h, 942h).

As shown in FIGS. 1-8 and 10-12 the housings (940h, 941h, 942h) of each of the actuators (940, 941, 942) is mounted on or to or in close physical proximity to or in direct thermal communication with a heated manifold (40).

The electric actuators 940, 941, 942 typically comprise a driver 940dr, 941dr, 942dr typically comprised of a stator and armature that are interconnected to a rotatably mounted rotor or shaft 940r, 941r, 942r such that when the drivers 940dr, 941dr, 942dr rotate on application and receipt of electrical energy or power, the shafts 940r, 941r, 942r are simultaneously rotatably moved and driven.

The rotor (940r, 941r, 942r) has a drive axis (Y), FIGS. 1, 2, 4, 5, 6, 10, The driver (940dr, 941dr, 942dr) is interconnected to the rotor (940r, 941r, 942r) and adapted to controllably drive the rotor rotatably around the drive axis Y.

The drivers (940dr, 941dr, 942dr) receives electrical energy or power from an electrical drive (940d, 941d, 942d). The electrical drive (940d, 941d, 942d) typically comprises an interface that receives electrical energy or power from a power source PS and controllably distributes the received electrical energy or power in controllably varied amounts during the course of an injection cycle to the drivers (940dr, 941dr, 942dr).

The actuator includes a housing (940h, 941h, 942h) that houses the rotor (940r, 941r, 942r) and the driver (940dr, 941dr, 942dr) and is adapted to support the rotor (940r, 941r, 942r) such that the rotor is drivably rotatable 940rt, 941rt, 942rt. The housing (940h, 941h, 942h) is typically thermally or heat conductive such that the housing receives heat or thermal energy from devices such as the manifold (40) with which the housing (940h, 941h, 942h) may be in thermally conductive communication or contact.

The electrical drive (940d, 941d, 942d) is typically housed within or by the housing (940h, 941h, 942h) or is physically mounted on or to the housing (940h, 941h, 942h) in thermally conductive communication or contact therewith.

The housing (940h, 941h, 942h) is typically mounted in a physical proximity or disposition relative to the heated manifold (40) or in a direct or indirect heat conductive contact with the heated manifold (40) such that one or the other or both of the housing (940h, 941h, 942h) and the electrical drive (940d, 941d, 942d) is or are in substantial heat or thermal communication or contact with the heated manifold (40).

The electrical drive (940d, 941d, 942d) typically includes a PWM or pulse-width modulator that converts received electrical energy or power into sinusoidal voltage waveforms, each sinusoidal voltage waveform being adapted to drive a corresponding phase-coil of the actuator driver (940dr, 941dr, 942dr).

The PWM or pulse-width modulator typically comprises an inverter or comparator.

The PWM modulator typically comprises a three-phase PWM inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the PWM modulator can be a DC bus voltage.

The interface of the electrical drive 940*d*, 941*d*, 942*d* is adapted to receive one or more control signals from a controller 16 of the injection molding apparatus and to convert electrical energy or power received the power source PS into sinusoidal waveforms based on the one or more control signals. The interface is comprised of the PWM or pulse width modulator which converts electrical energy or power received from the power source into sinusoidal waveforms based on the one or more control signals.

The one or more control signals received by the interface of the electrical drive contain control information causing the pulse width modulator to convert the received electrical energy or power into sinusoidal waveforms adapted to drive the corresponding phase-coils of the actuator driver to adjust one or more of a position, a velocity or torque of the actuator rotor 940*r*, 941*r*, 942*r*.

The one or more control signals can comprise analog electrical signals received at the electrical drive from the controller 16.

The electrical drive 940*d*, 941*d*, 942*d* can further comprise one or the other or both of a digital signal receiving (16*r*) and transmitting (16*s*) device, FIG. 1A. The controller (16) includes a digital command or signal generating mechanism such as a computer drive, microcontroller, microcircuit, chipset or the like interconnected to a digital data storage medium to and from which the digital command or signal generating mechanism exchanges digital signals, data or commands. The controller (16) is adapted to send digital signals, commands, data to a digital signal receiving device (16*r*) contained within the electrical drive (940*d*, 941*d*, 942*d*). The digital commands that are received (16*s*) by the electrical drive (940*d*, 941*d*, 942*d*) are used by the drive (940*d*, 941*d*, 942*d*) to control distribution of electrical energy or power to the driver (940*dr*, 941*dr*, 942*dr*) thus controlling the speed of rotation of the rotor of the actuator (940, 941, 942) during the course of the injection cycle.

The electrical drive (940*d*, 941*d*, 942*d*) can also include a digital signal, data or command sending device (16*s*) that is typically comprised of a microcontroller, microcircuit, chipset or the like and adapted to communicate or send digital signals back to digital signal receiving device contained within the controller (16).

The digital control signals can include one or more of differential position commands, differential current commands, and differential velocity commands.

The digital signal receiving and transmitting device (16*r*, 16*s*) further can receive digital signals from the actuator, wherein the digital signals received from the actuator include one or more feedback signals corresponding to operation of one or more of the actuator and the actuator rotor.

The one or more feedback signals received by the electrical drive (940*d*, 941*d*, 942*d*) from the actuator can include one or more of an incremental feedback signal and an absolute feedback signal. Such incremental feedback signal or absolute feedback signal sent by the actuator to the electrical drive can be communicated or sent back to the controller (16) by the digital signal sending device (16*s*).

Figure 2:
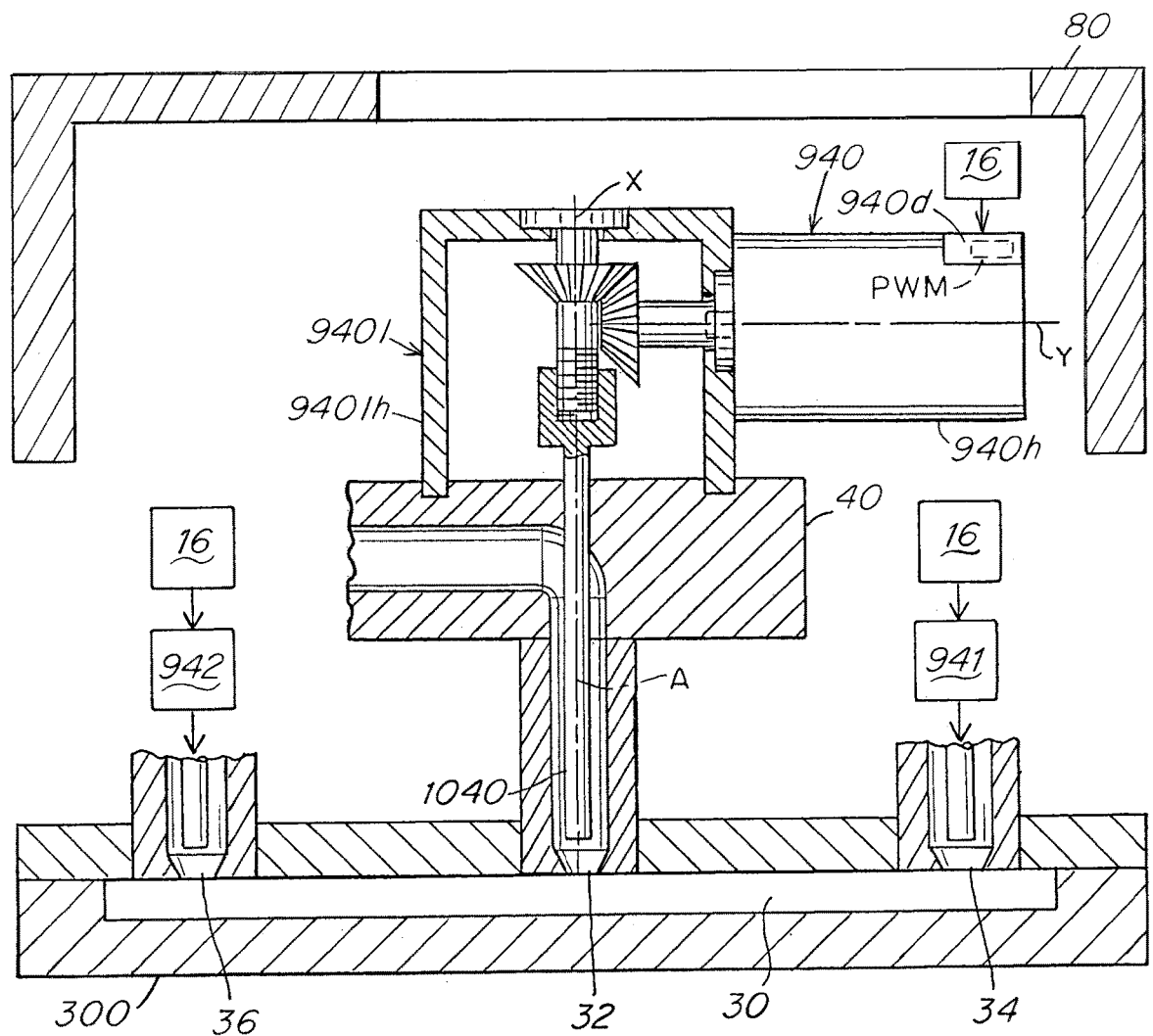
FIG. 2 is a side sectional schematic view of an electric actuator in a apparatus similar to the FIG. 1 apparatus where the actuator (940) has a drive axis Y that is arranged non-coaxially relative to the travel axis of the valve pin (1040), the actuator housing (940*h*) being mounted to or on or in direct thermal communication with the heated manifold (40) via mounting of the actuator (940) to a linear travel converter (940*l*, 940*h*) which is in turn mounted on or to or in direct thermal communication or contact with the heated manifold (40).

FIG. 2 shows an embodiment similar to the FIG. 1 apparatus where the actuator (940) has a drive axis Y that is arranged non-coaxially relative to the travel axis of the valve pin (1040), the actuator housing (940*h*) being mounted to or on or in direct thermal communication with the heated manifold (40) via mounting of the actuator (940) to a linear travel converter (940*l*, 940*h*) which is in turn mounted on or to or in direct thermal communication or contact with the heated manifold (40).

Figure 3:
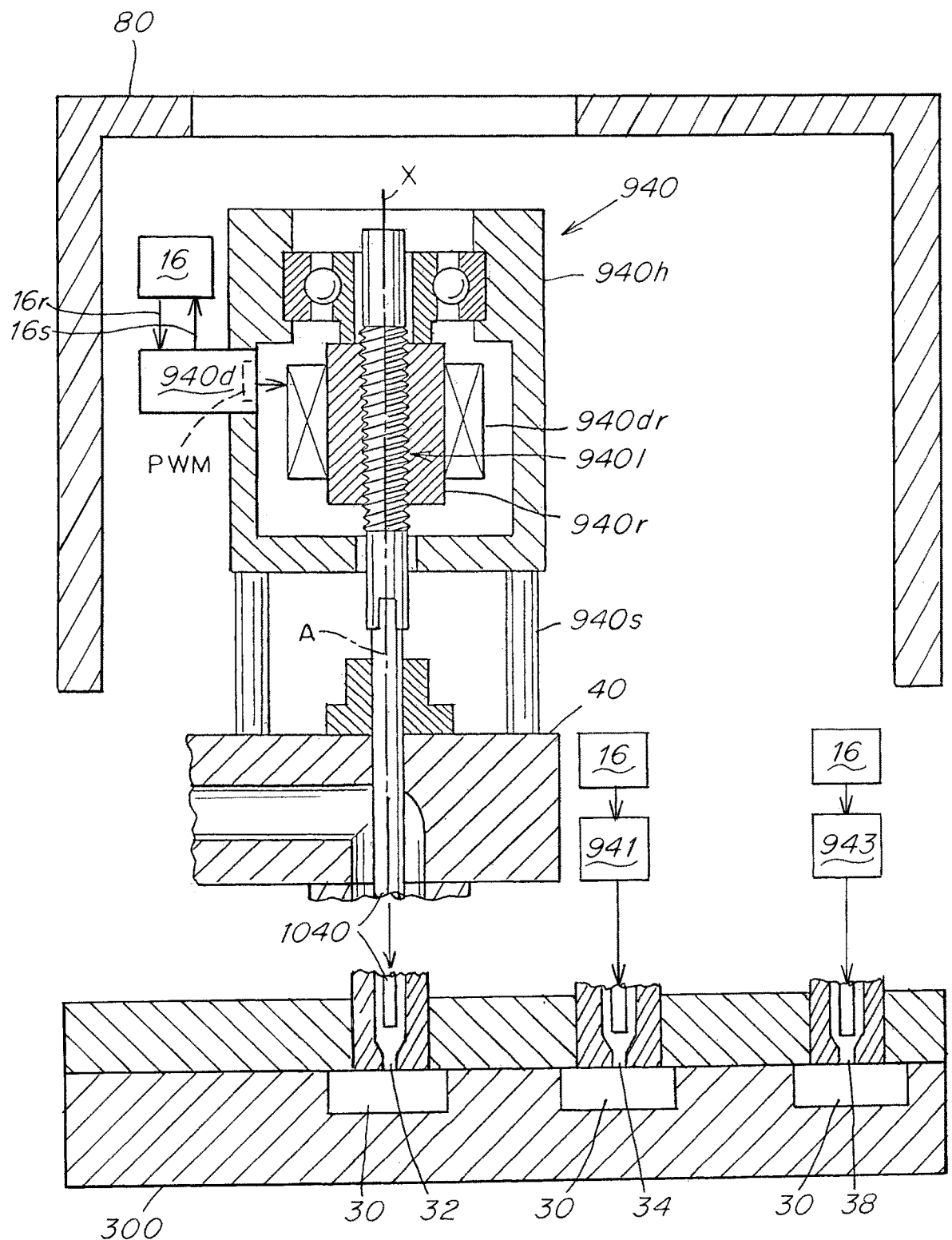
FIG. 3 is a side sectional schematic view of an electric actuator in a apparatus similar to the FIG. 1 apparatus where the actuator (940) has a drive axis Y that is coaxial with the travel axis of the valve pin (1040), the actuator housing (940*h*) being mounted to or on or in direct thermal communication with the heated manifold (40) via mounts (940*s*) mounted on or to or in direct thermal communication or contact with the heated manifold (40).

FIG. 3 shows an embodiment where the actuator (940) has a drive axis Y that is coaxial with the travel axis of the valve pin (1040), the actuator housing (940*h*) being mounted to or on or in direct thermal communication with the heated manifold (40) via mounts (940*s*) mounted on or to or in direct thermal communication or contact with the heated manifold (40).

Figure 4:
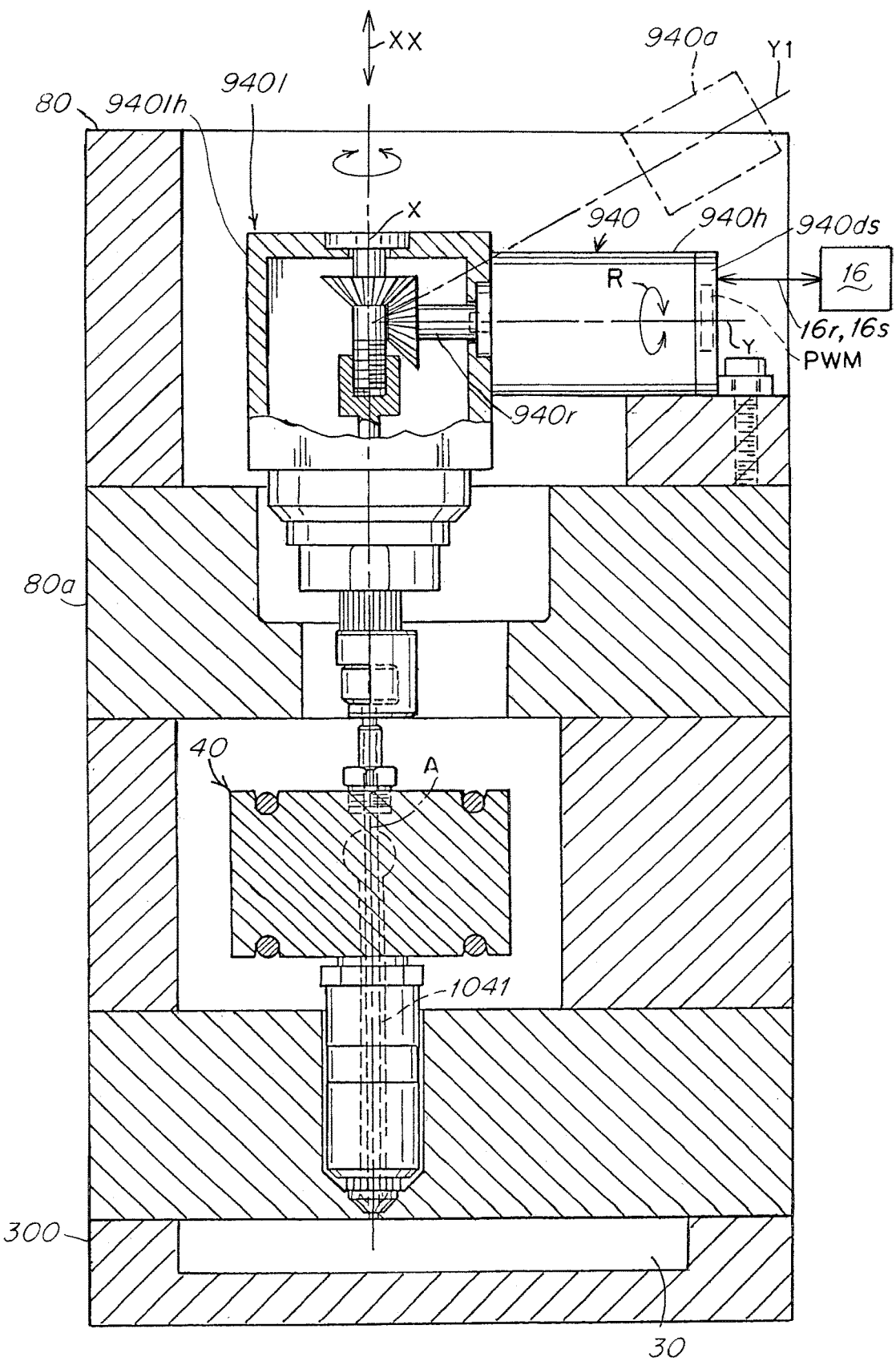
FIG. 4 is a side sectional schematic view of another electric actuator in a apparatus similar to the FIGS. 1, 2 apparatus where the actuator (940) has a drive axis Y that is arranged non-coaxially relative to the travel axis of the valve pin (1040), the actuator housing (940*h*) being mounted in one iteration (940) both to a top clamp plate (80) and to or on or in direct thermal communication with the heated manifold (40) via mounting of the actuator (940) to a linear travel converter (940*l*, 940*h*) which is in turn mounted on or to or in direct thermal communication or contact with the heated manifold (40). In another iteration (940*a*) the housing of the actuator may or may not be mounted also to the top clamp plate 80.

FIG. 4 shows an embodiment where the actuator (940) has a drive axis (Y) that is arranged non-coaxially relative to the travel axis of the valve pin (1040), the actuator housing (940*h*) being mounted in one iteration (940) both to a top clamp plate (80) and to or on or in direct thermal communication with the heated manifold (40) via mounting of the actuator (940) to a linear travel converter (940*l*, 940*h*) which is in turn mounted on or to or in direct thermal communication or contact with the heated manifold (40). In another iteration (940*a*) the housing of the actuator may or may not be mounted also to the top clamp plate 80.

Figure 5:
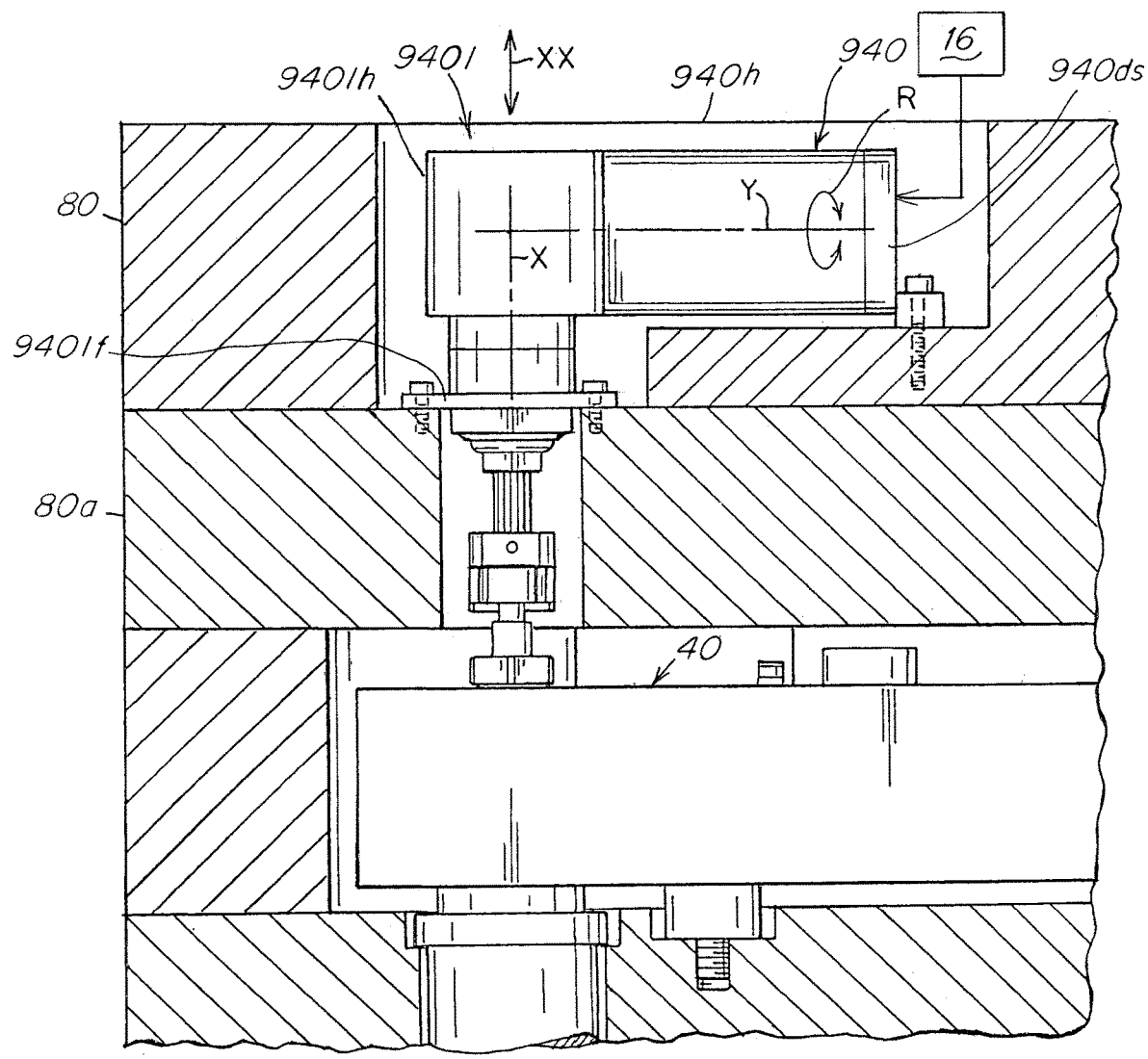
FIG. 5 is a side sectional schematic view of another electric actuator in a apparatus similar to the FIGS. 1, 2 apparatus where the actuator (940) has a drive axis Y that is arranged non-coaxially relative to the travel axis of the valve pin (1040), the actuator housing (940*h*) being mounted to or on or in direct thermal communication with the heated manifold (40) via mounting of the actuator (940) to a linear travel converter (940*l*, 940*h*) which is in turn mounted on or to a top clamping plate (80), the linear travel converter being disposed in direct thermal communication with the heated manifold (40).

FIG. 5 shows a apparatus similar to the FIGS. 1, 2 apparatus where the actuator (940) has a drive axis Y that is arranged non-coaxially relative to the travel axis X of the valve pin (1040), the actuator housing (940*h*) being mounted to or on or in direct thermal communication with the heated manifold (40) via mounting of the actuator (940) to a linear travel converter (940*l*) having a housing (940*lh*) which is in turn mounted on or to a top clamping plate (80) via a flange (940*lf*), the linear travel converter (940*l*) being disposed in direct thermal communication with the heated manifold (40).

Figure 6:
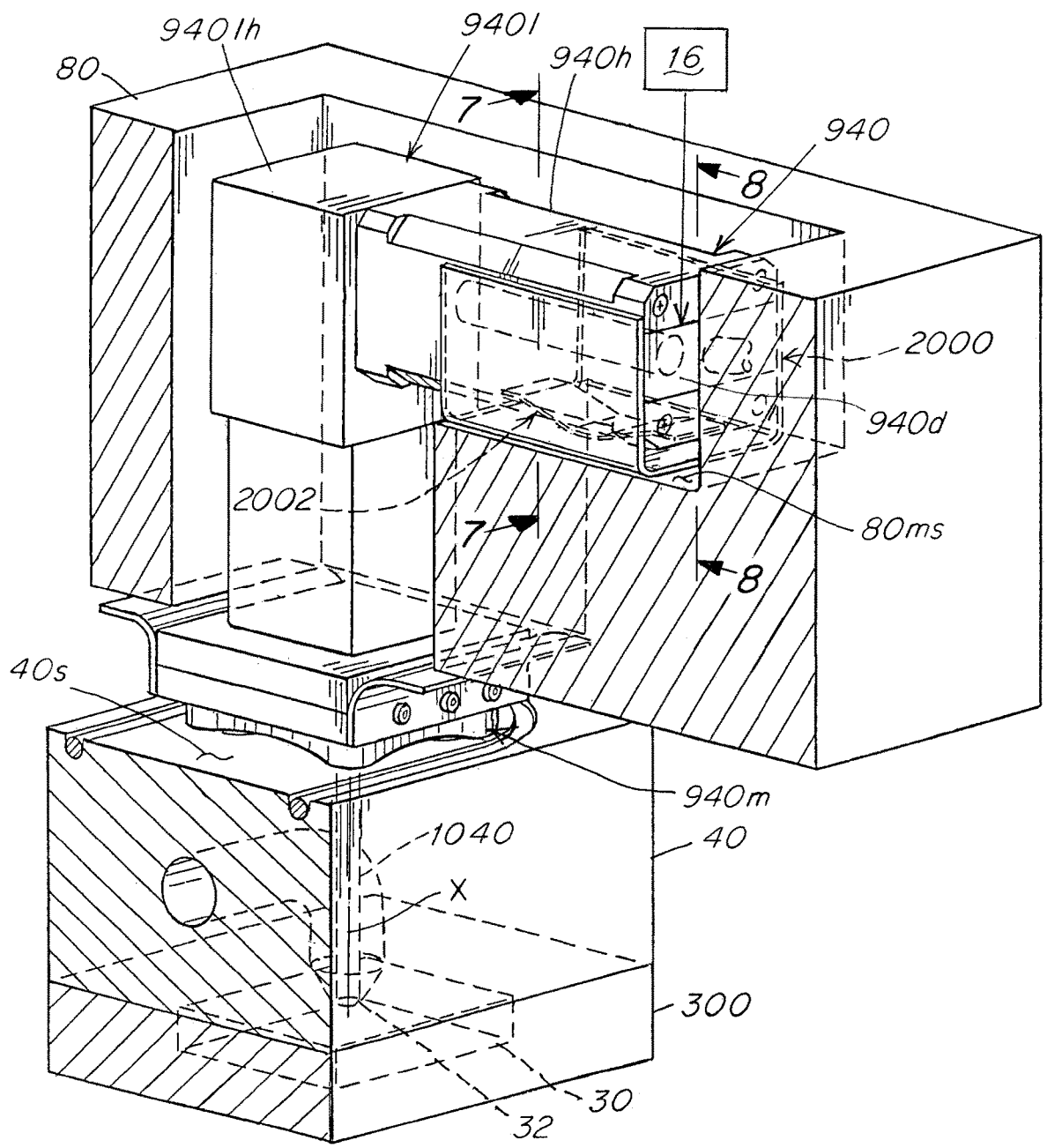
FIG. 6 is a top rear partially sectional perspective view of another electric actuator in a apparatus similar to the FIGS. 1, 2 apparatus where the actuator (940) has a drive axis Y that is arranged non-coaxially relative to the travel axis X of the valve pin (1040), the actuator housing (940*h*) being mounted to or on or in direct thermal communication with the heated manifold (40) via mounting of the actuator (940) to a linear travel converter (940*l*, 940*h*) which is in turn mounted on or to or in direct thermal communication or contact with a heated manifold (40), the actuator housing (940) also being mounted in direct thermal communication with the top clamp plate (80).

FIG. 6 an embodiment where the actuator (940) has a drive axis Y that is arranged non-coaxially relative to the travel axis X of the valve pin (1040), the actuator housing (940*lh*) being mounted to or on or in direct thermal communication with the heated manifold (40) via mounting of the actuator (940) to a linear travel converter (940*l*) which is in turn mounted via a mounting plate (940*m*) on or to or in direct thermal communication or contact with a heated manifold (40) such that the actuator housing (940) is disposed in direct thermal communication or contact with the top clamp plate (80).

Figure 7:
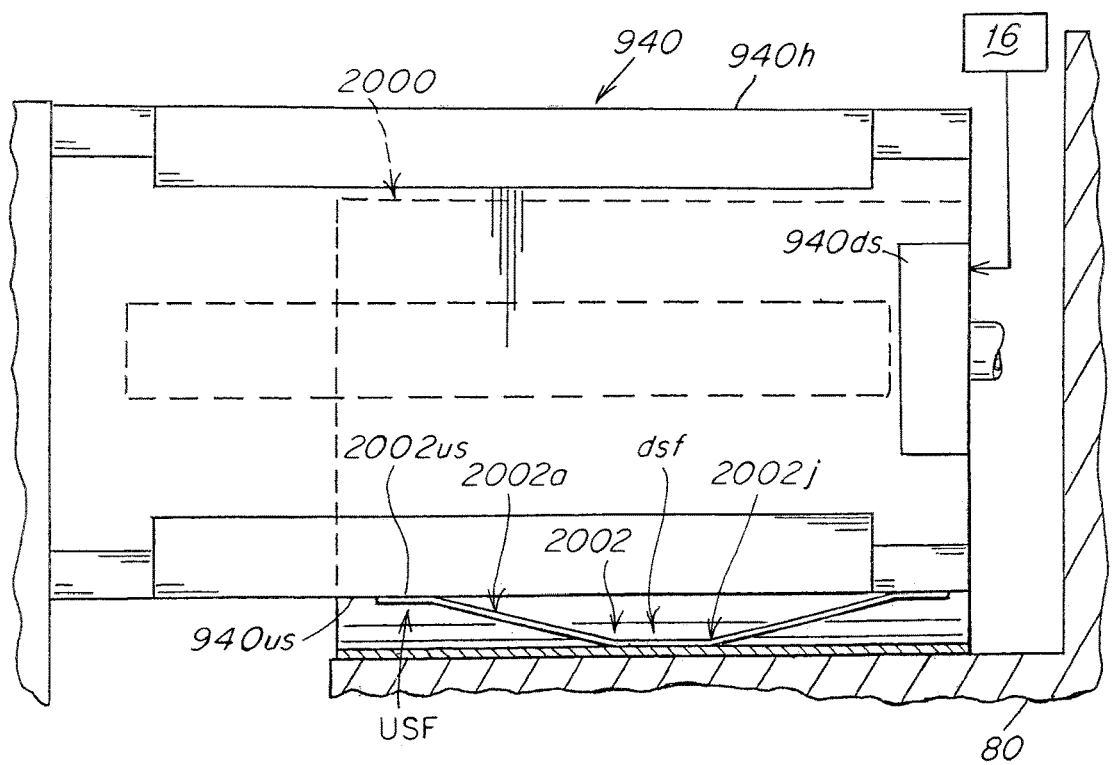
FIG. 7 is a sectional view taken along lines 7-7 of FIG. 6.
Figure 8:
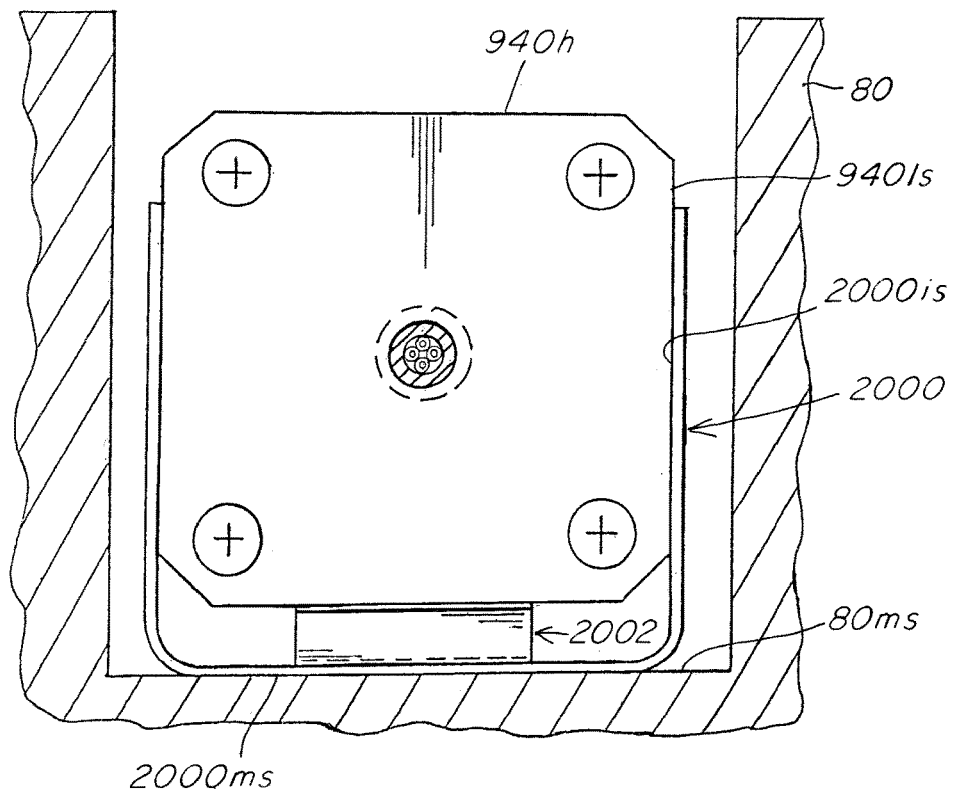
FIG. 8 is a sectional view taken along lines 8-8 of FIG. 6.

The actuator housing (940*h*) of the FIG. 6 embodiment is mounted in heat conductive communication or contact with the top clamping plate (80) via a mount (2000) as shown in FIGS. 7, 8. The mount (2000) is preferably comprised of a thermally conductive material having first (2000*is*) and second (2000*ms*) heat conductive surfaces that are disposed between the clamping plate (80) and the actuator housing (940*h*). A surface (940*ls*) of the actuator housing (940*h*) is mounted in thermal communication or contact with the first heat conductive surface (2000*is*) and a surface (80*ms*) of the clamping plate (80) is mounted in thermal communication or contact with the second conductive surface (2000*ms*). The second conductive surface (2000*ms*) of the mount (20000) is adapted to be urged into compressed (dsf) thermally conductive contact or communication with the surface (80*ms*) of the clamping plate (80).

The mount (2000), FIGS. 6, 7, 8 includes a resiliently compressible spring (2002) disposed between the actuator housing (940*h*) and the clamping plate (80) that is adapted to urge (dsf) the surface (2000*ms*) of the mount (2000) into compressed thermally conductive contact or communication with the surface (80*ms*) of the clamping plate (80).

The spring (2002), FIGS. 6, 7, 8 comprises one or more resiliently compressible arms (2002*a*) that are resiliently bendable 2002*j* and have an actuator engagement surface (2002*us*) adapted to engage a complementary surface (940*us*) of the actuator housing (940*h*). The spring (2002), the mount (2000) and the clamping plate are arranged such that the resiliently compressible arms (2002*a*) bend when the actuator housing (940*h*), mount (2000) and clamping plate (80) are assembled together with the manifold (40) to cause the actuator engagement surface (2002*us*) to compressibly engage (USF) the complementary surface (940*us*) and to urge the surface (2000*ms*) of the mount (2000) into compressed (dsf) thermally conductive contact or communication with the surface (80*ms*) of the clamping plate (80) when the heated manifold (80) is brought to operating temperature.

Figure 9:
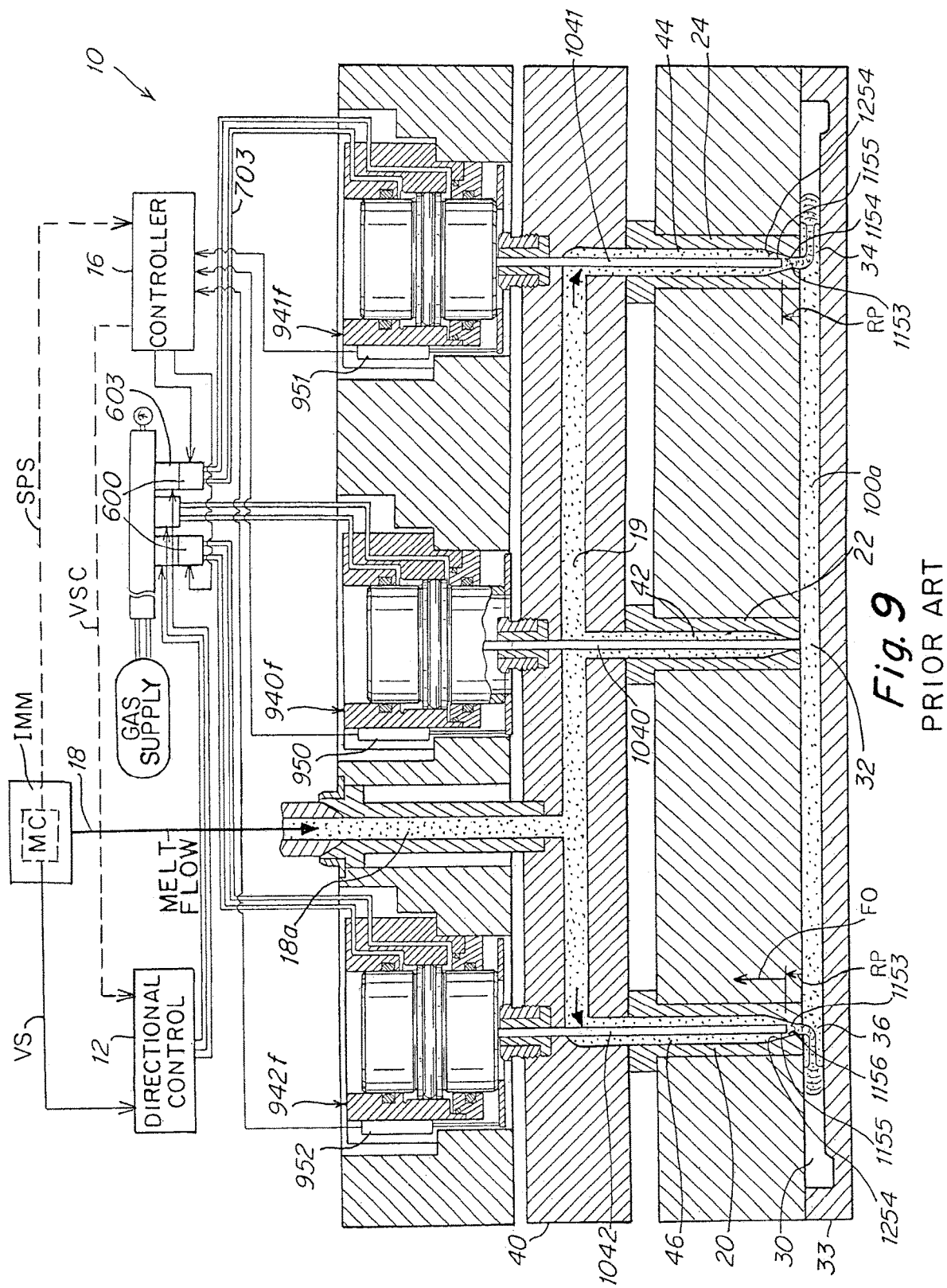
FIG. 9 is a side schematic view of a prior art injection molding apparatus in which an injection molding machine (IMM) includes a stock or standard IMM controller or signal generator that sends a standard IMM controller signal to the solenoid of a directional flow control valve that directs the position of the valve to move between a valve gate closed and valve gate open position.

FIG. 9 shows a conventional prior art pneumatically (or hydraulically) driven apparatus 10 with a central nozzle 22 feeding molten material 18 from an injection molding machine IMM through a main inlet 18*a* to a distribution channel 19 of a manifold 40. The IMM typically comprises a barrel (not shown) and a controllably rotatably drivable or driven screw BS that initiates and ends an injection cycle at selected points in time when the screw BS is rotatably driven to generate flow of injection fluid 18. The beginning of an injection cycle is typically defined at a selected point in time when the screw BS is initially rotated from a standstill position or at a time that occurs shortly after the time when the screw BS is initially begun rotating. The end of the cycle is typically defined by a time at which the screw BS is stopped from rotating following and after the selected time that defines the beginning of the cycle when the screw BS is drivably rotated. The distribution channel 19 commonly feeds three separate nozzles 20, 22, 24 which all commonly feed into a common cavity 30 of a mold 33. One of the nozzles 22 is controlled by fluid driven actuator 940*f* and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

Figure 10:
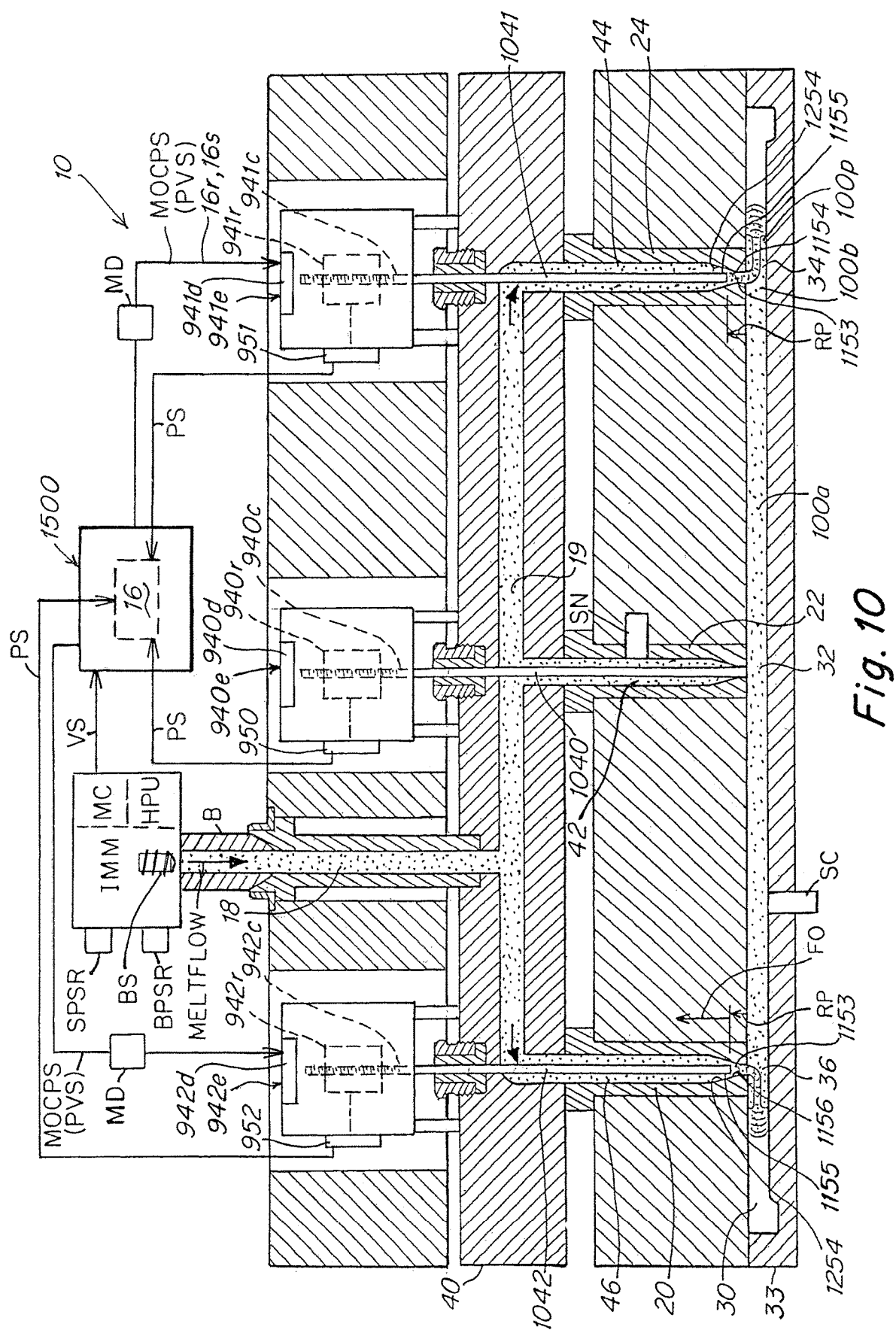
FIG. 10 is a side schematic view of one embodiment of an injection molding apparatus according to the invention where the valve gates include an electrically powered or electric motor containing actuator, the apparatus including a machine signal converter that receives a standard signal generated by an injection machine controller converts the signal to a control signal compatible with the signal receptor of the electrically powered actuators used in the apparatus, the converter routing the converted signal to the actuator processor.

As shown in FIGS. 9 and 10 the injection cycle using apparatuses according to the present invention are most preferably a cascade process as described in U.S. Pat. No. 1,056,945, the disclosure of which is incorporated by reference as if fully set forth herein, where injection is effected or initiated in a sequence from the center nozzle 22 first and at a later predetermined time from the lateral nozzles 20, 24.

As described for example in U.S. Pat. No. 1,056,945, the injection cycle is started by first opening the pin 1040 of the center nozzle 22 and allowing the fluid material 100 (typically polymer or plastic material) to flow up to a position the cavity just before the distally disposed entrance into the cavity 34, 36 of the gates of the lateral nozzles 24. After an injection cycle is begun, the gate of the center injection nozzle 22 and pin 1040 is typically left open only for so long as to allow the fluid material to travel to a position just past the positions at which the downstream gates 34, 36 are located. Once the fluid material has travelled just past the lateral or downstream gate positions 34, 36, the center gate 32 of the center nozzle 22 is typically closed by pin 1040. The lateral or downstream gates 34, 36 are then opened by upstream withdrawal of lateral nozzle pins 1041, 1042. The rate of upstream withdrawal or travel velocity of lateral pins 1041, 1042 is typically carried out such that one or both of the downstream pins 1041, 1042 are first withdrawn upstream over some portion of the full upstream withdrawal path of the pins 1041, 1042 at a first relatively slow speed or velocity and subsequently at a higher speed as described in detail in U.S. Pat. No. 9,011,736, the disclosure of which is incorporated by reference as if fully set forth herein. The center gate 32 and associated actuator 940*f* and valve pin 1040 can remain open at, during and subsequent to the times that the lateral or downstream gates 34, 36 are opened such that fluid material flows into cavity 30 through both the center gate 32 and one or both of the lateral gates 34, 36 simultaneously. When the lateral or downstream gates 34, 36 are opened and fluid material is allowed to first enter the mold cavity into the stream that has been injected from center nozzle 22 past gates 34, 36, the two streams mix with each other. If the velocity of the fluid material is too high, such as often occurs when the flow velocity of injection fluid material through gates 34, 36 is at maximum, a visible line or defect in the mixing of the two streams will appear in the final cooled molded product at the areas where gates 34, 36 inject into the mold cavity. By injecting fluid at a reduced flow rate for a relatively short period of time at the beginning when a downstream gate 34, 36 is first opened and following the time when fluid first enters the first downstream flowing stream, the appearance of a visible line or defect in the final molded product can be reduced or eliminated.

The rate or velocity of upstream and downstream travel of pins 1041, 1042 starting from either the gate closed position or the fully open upstream position is controlled via an actuator controller 16 which controls the rate and direction of flow of pneumatic or hydraulic fluid from the drive system 14 to the actuators 940*f*, 941*f*, 942*f*. A predetermined profile of valve pin or actuator positions versus elapsed time can be input into the actuator controller 16 as the basis for controlling upstream and downstream travel of the valve pin(s) 1041 et al. at one or more selected velocities over the course of travel of the valve pin through the stroke length either upstream or downstream. For example the actuator controller 16 can include instructions that instruct the actuators to move at a reduced velocity relative to one or more selected higher velocities of withdrawal. The higher velocity is typically selected to be the highest velocity at which the system is capable of driving the actuators. Typically, the instructions instruct the actuators to move the valve pins upstream from the gate closed position at a reduced velocity over the course of travel where the tip end of the valve pin restricts the flow of injection fluid 18 to less than the flow would otherwise be if the valve pin were disposed fully upstream, the restriction occurring as a result of the tip end of the valve pin restricting the size of the flow path or opening at or near the gate 32, 34, 36 to a size that is less than the size of the opening or flow path would otherwise be if the valve pin were disposed fully upstream of the gate 32, 34, 36.

In the FIG. 9 prior system, the actuator controller 16 typically receives a signal in real time from a pressure sensor 603 (or 605, 607) disposed in the drive fluid line communicating with the exit of the metering valve 600, the signal being indicative of the reduced drive fluid pressure in line 703 (or 705, 707). In a system where an electric motor apparatus is used in conjunction with an apparatus according to the invention, the actuator controller 16 typically receives a signal in real time indicative of the position of the actuator or the valve pin 1041, 1042. The actuator controller 16 instructs the valve 600 or the electric actuator 941*e*, 942*e* to move according to a predetermined profile of drive pressures or electric actuator or valve pin positions that effect the initial slow and subsequent fast moving valve pin velocity protocols described herein.

As used in this application with regard to various monitoring and control systems, the terms "controller," "component," "computer" and the like are intended to refer to a computer-related entity, either hardware, a combination of hardware and software, software, or software in execution. For example, a component or controller may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Claimed methods of the present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the term "data" or the like means any sequence of symbols (typically denoted "0" and "1") that can be input into a computer, stored and processed there, or transmitted to another computer. As used herein, data includes metadata, a description of other data. Data written to storage may be data elements of the same size, or data elements of variable sizes. Some examples of data include information, program code, program state, program data, other data, and the like.

As used herein, computer storage media or the like includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

The methods described herein may be implemented in a suitable computing and storage environment, e.g., in the context of computer-executable instructions that may run on one or more processors, microcontrollers or other computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

A "controller," as used herein also refers to electrical and electronic control apparatus that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

As shown in the apparatus of FIG. 9 the injection molding machine IMM includes its own internal manufacturer supplied machine controller that generates standardized beginning of cycle gate closed and end of cycle gate open and gate closed machine voltage signals VS typically 0 volts for gate open and 24 volts for gate open (or 0 volts and 120 volts respectively). The standardized machine voltage signals VS are typically sent either directly to the solenoids of a master directional control valve 12 (that controls the direction of flow of actuator drive fluid into or out of the drive chambers of all of the plurality of fluid driven actuators 940f, 941f, 942f) to cause the directional control valve 12 (DCV) to move to a gate closed or gate open actuator drive fluid flow position. Or, the same standardized voltage signals VSC can be sent to the directional control valve 12 via the actuator controller 16 which generates the same standardized voltage signals VSC as the VS signals in response to receipt from a screw position sensor SPSR of a machine screw position signal SPS sent by the injection molding machine IMM to the actuator controller 16, the actuator controller 16 thus generating the same beginning of cycle and end of cycle control voltage signals VSC as the machine IMM can otherwise generate and send VS directly to the directional control valve 12. Thus, where conventional standardized directional control valves 12 are used, the sending of start of cycle and end of cycle signals can be simplified via electrical or electronic signal connections directly to the internal signal generator or controller contained within the injection molding machine.

Electrically powered actuators or electric motors and proportional directional control valves cannot directly receive and utilize a standardized 0 volt (gate closed), 24 volt (gate open) or 0 volt (gate closed) 120 volt (gate open) signals generated by the start and stop cycle controller or signal generator that is typically included in a conventional injection molding machine.

Figure 11:
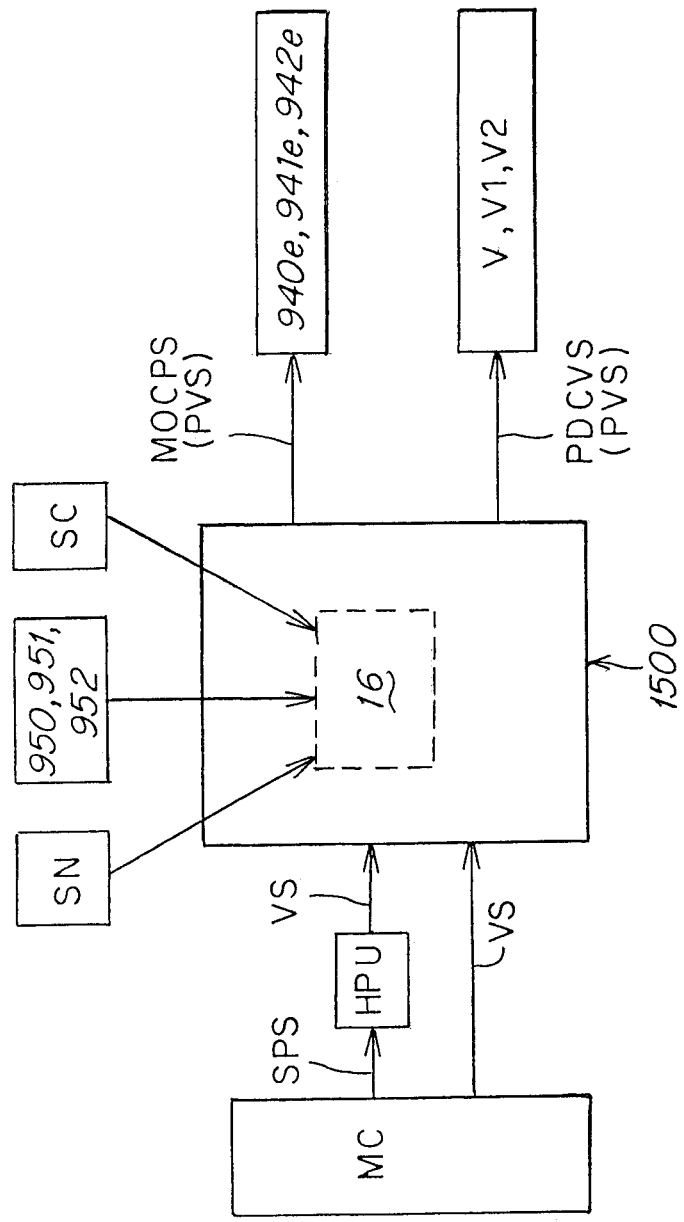
FIG. 11 is a generic schematic diagram of an arrangement of signal communications between an injection molding machine controller, sensors, a signal converter and electric actuators or the interface of a proportional directional control valve.

As shown in a generic schematic form in FIG. 11, an apparatus 10 according to the invention incorporates a signal converter 1500 that can receives standardized injection machine generated start of cycle and end of cycle signals VS (such as 0 volts, 24 volts or 120 volts) and converts the received standardized signal VS to an output power signal MOCPS or PDCVS that is compatible for receipt and use by an electric motor or a proportional direction control valve power signal. The two different actuator based systems, namely electric motor and proportional directional control valve, are shown together in the generic FIG. 11 for illustration purposes only. More typically, a practical implementation of a system as shown in FIG. 11 would be such that the converter 1500 would contain a single microcontroller and an interconnected driver that is configured to work with one or the other of an electric actuator based system or a proportional directional control valve system.

FIG. 10 shows an electric actuator based apparatus in simplified schematic form. As shown in FIG. 1, electric actuators 940e, 941e, 942e each have a rotating rotor 940r, 941r, 942r that is driven by electrical power (typically delivered via the converter 1500) one or more of the precise polarity, amplitude, voltage and strength of which is controlled for input to the motors by actuator controller 16 and the program contained in the actuator controller 16. The rotating rotors 940r, 941r, 942r are interconnected to a translationally movable shaft or other suitable connecting devices 940c, 941c, 942c that interconnect the valve pins 1040, 1041, 1042 to the driven rotors 940r, 941r, 942r. A typical interconnection between a shaft driven by a rotor and the head of a valve pin is shown in U.S. Reexamination Certificate U.S. Pat. Nos. 6,294,122 C1 and 9,492,960 the disclosures of which are incorporated herein by reference in their entirety as if fully set forth herein.

FIG. 10 illustrates an example of a apparatus 10 according to the invention having a plurality of electric power driven actuators 940e, 941e, 942e, with a central nozzle 22 feeding molten material 18 from an injection molding machine IMM through a main inlet 18a from a barrel of the injection molding machine IMM to a distribution channel 19 of a manifold 40. As in the conventional apparatus of FIG. 1 in the FIGS. 2, 3 apparatus the IMM typically comprises a barrel (not shown) and a controllably rotatably drivable or driven screw BS disposed within the barrel to generate a pressurized supply of injection fluid 18 the pressure of which can be detected by a barrel pressure sensor BPSR which can send a signal indicative of barrel pressure to a controller 16 for use in controlling positioning and velocity of the valve pin 1040, 1041, 1042. The screw BS of the IMM initiates and ends an injection cycle at selected points in time when rotation of the screw BS is started and stopped. The beginning of an injection cycle is typically defined at a first selected point in time when the screw BS is initially rotated from a standstill position or at a time that occurs shortly after the time when the screw is initially rotated. The end of the cycle is typically defined by a selected second time following and after the first selected time at which second time the screw is stopped from rotating and injection fluid 18 is stopped from being injected into the heated manifold 40.

The distribution channel 19 commonly feeds three separate nozzles 20, 22, 24 which all commonly feed into a common cavity 30 of a mold 33. One of the nozzles 22 is controlled by an electric motor actuator 940e and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

As with the apparatus of FIG. 9, an injection cycle using the apparatus of FIGS. 10, 11 is typically are used to carry out a cascade or sequential valve gate process where injection is effected in a sequence from the center nozzle 22 first and at later predetermined times from the lateral nozzles 20, 24. The cascade process is discussed in detail as an example only, the invention encompassing configurations and protocols where a single valve pin and valve gate inject into a single cavity.

Also as with the FIG. 9 apparatus, the FIGS. 10, 11 apparatuses 10 include an actuator controller 16 that typically includes a program that converts a standard voltage signal (such as 0V, 24V, 120V) received from an injection machine controller MC into an instruction signal IS that is compatible with, receivable and interpretable by a motor driver MD to cause the motor driver MD to generate a motor operating control power signal MOCPS that signals the start of an injection cycle and the end of injection cycle, the start typically being a power signal that drives the motor to withdraw the valve pin 1040, 1041, 1042 from a gate closed position and the end being a power signal that drives the motor to drive the valve pin from an upstream position to a gate closed position. The controller 16 can include a program with instructions that can move and drive the valve pin to and along any predetermined position or velocity profile including at reduced velocities as described above. Reduced velocity in the case of the FIG. 2 apparatus means a velocity that is less than the maximum velocity at which the electric actuator is capable of driving the pin, typically less than about 75% of maximum and more typically less than about 50% of maximum velocity whether upstream or downstream.

The actuator controller 16 typically includes additional instructions that can instruct a valve pin 1041, 1042, 1040 to be driven either upstream or downstream starting from either a fully closed downstream or a fully upstream, gate open position at one or more reduced upstream or reduced downstream velocities over at least the beginning portion of the upstream path of travel of the valve pins 1040, 1041, 1042 or the latter portion of the downstream path of travel of the valve pins toward the gates 32, 34, 36 where the tip end 1142 of the pin 1041 restricts flow of the injection fluid through the gate such as shown and described in U.S. Pat. No. 10,569,458.

In one embodiment, an electric actuator 940e, 941e, 942e is drivably interconnected to a valve pin 1040, 1041, 1042 in an arrangement wherein the electric motor drives the valve pin along the axis A of the valve pin and drives the tip end of the valve pin between a first position where the tip end of the valve pin obstructs the gate 34 to prevent the injection fluid from flowing into the cavity, a second position upstream of the first position wherein the tip end of the valve pin restricts flow 1153 of the injection fluid along at least a portion of the length of the drive path extending between the first position and the second position, and a third maximum upstream position where the injection fluid material flows freely without restriction from the tip end of the pin.

The electric motor 940e, 941e, 942e can be configured and arranged relative to its associated valve pin 1040, 1041, 1042 such as shown in FIG. 3 such that the driven rotor 940r, 941r, 942r and shaft components of the motor are axially aligned with the axis A of the valve pin 1040, 1041. Alternatively, a motor configuration can be used such as in U.S. Pat. No. 9,492,960 and FIGS. 2, 4, 5, 6 where the driven rotor and shaft components are arranged at an angle to the axis A, X FIGS. 2, 4, 5, 6 of the valve pin 1040, 1041, 1042.

In an embodiment such as shown in FIG. 10 an injection cycle can be started by first opening the pin 1040 of the center nozzle 22, and allowing the fluid material 100a (typically polymer or plastic material) to flow up to a position the cavity just before 100b the distally disposed entrance into the cavity 34, 36 of the gates of the lateral nozzles 24, 20. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 at some predetermined time during the injection cycle. The lateral gates 34, 36 are then opened by upstream withdrawal of lateral nozzle pins 1041, 1042.

In alternative embodiments, the center gate 32 and associated actuator 940e, and valve pin 1040 can remain open at, during and subsequent to the times that the lateral gates 34, 36 are opened such that fluid material flows into cavity 30 through both the center gate 32 and one or both of the lateral gates 34, 36 simultaneously. When the lateral gates 34, 36 are opened and fluid material 100a is allowed to first enter the mold cavity into the stream that has been injected from center nozzle 22 past gates 34, 36, the two streams mix with each other. If the velocity of the fluid material is too high, such as often occurs when the flow velocity of injection fluid material through gates 34, 36 is at maximum, a visible line or defect in the mixing of the two streams will appear in the final cooled molded product at the areas where gates 34, 36 inject into the mold cavity. By injecting from a downstream gate 34, 36 at a reduced flow rate for a relatively short period of time at the beginning when the gate 34, 36 is first opened and following the time when fluid first enters the flow stream 100a, the appearance of a visible line or defect in the final molded product can be reduced or eliminated.

Figure 12:
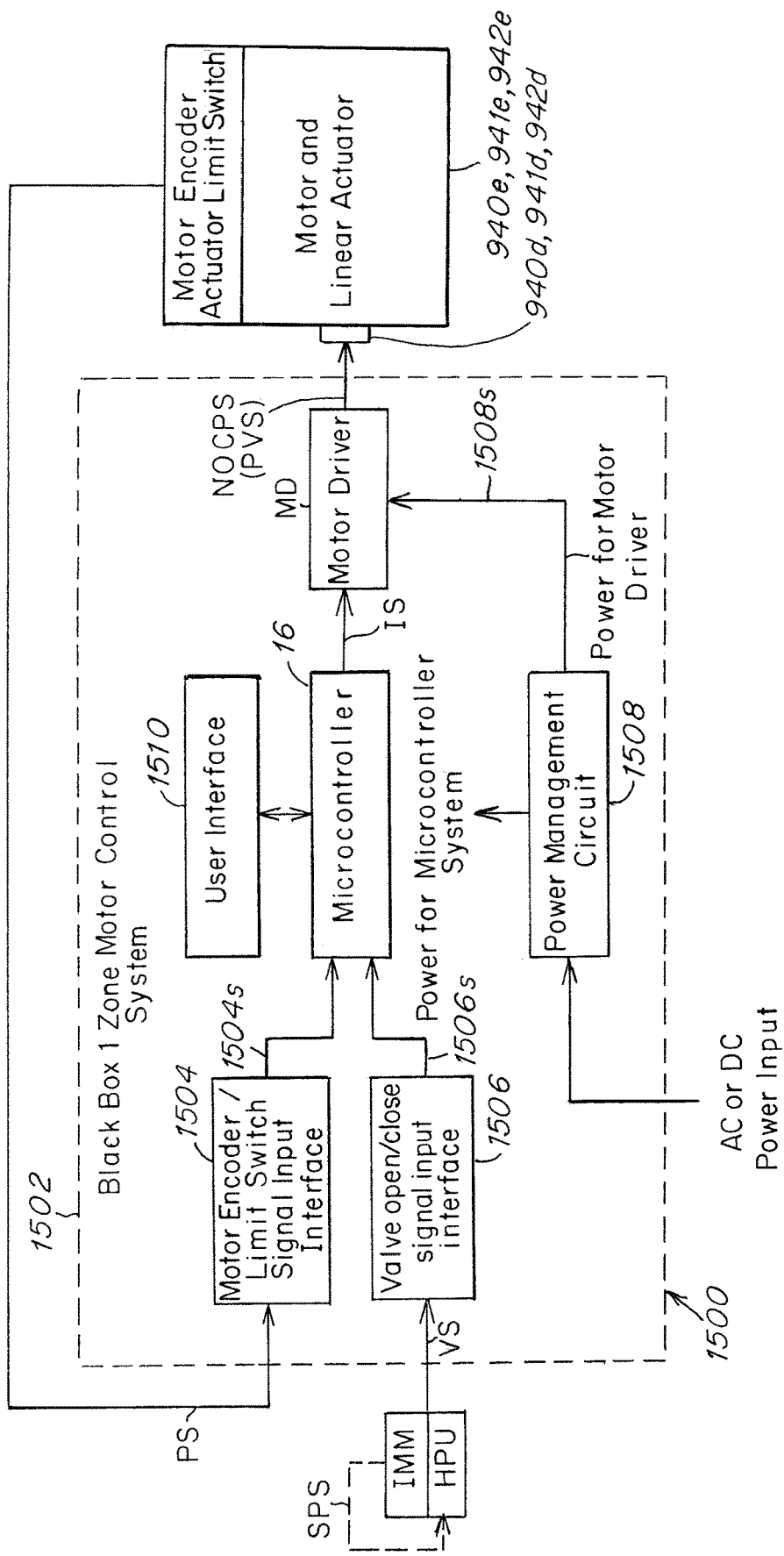
FIG. 12 is a schematic diagram of an arrangement of signal communications between an injection molding machine controller, position sensors, a signal converter and electric actuators.

A signal converter 1500, FIGS. 10, 11 is provided that enables a user to connect the standardized voltage signal output (VS, VSC) of a conventional IMM controller to the input of the electric motors 940e, 941e, 942e, FIGS. 2, 3, 4, 5, 6, 10, 11, 12 in the same manner that the user interconnected an IMM controller in a conventional apparatus as in FIG. 1 to DCVs. The signal converter 1500 receives and converts received IMM voltage signals (such as 0 volts, 24 volts, 120 volts) to control signals (MOCPS or PDCVS that operate to begin cycle and end cycle). As shown in FIGS. 10, 11, 12 the standardized voltage signals VS can be alternatively generated by an HPU (hydraulic power unit) that is physically separate but interconnected to the machine controller MC, the HPU unit, FIGS. 10, 11, 12 receiving a barrel screw position signal SPS from the machine controller and generating therefrom a corresponding standardized VS signal that is in turn sent to the controller 16 for conversion to an instruction signal IS usable by either a motor driver MD, or by a proportional directional valve driver HVD, PVD, to drive either a motor or a proportional directional valve to initiate and end an injection cycle.

Thus the standard start and stop control signals generated by an IMM (VS, VSC) can operate in conjunction with the converter 1500 to instruct either the electric actuators, 940e, 941e, 942e or the fluid driven actuators 940p, 941p, 942p, to at least initiate or begin an injection cycle (such as by instructing the actuators 940e, 941e, 942e, 940p, 941p, 942p to drive a valve pin upstream from a gate closed position) and to end or stop an injection cycle (such as by instructing the actuators 940e, 941e, 942e, 940p, 941p, 942p to drive a valve pin downstream from a gate open position into a gate closed position).

Most preferably the physical or mechanical electric signal connectors that are typically used to connect a wire or cable from the IMM (or machine controller MC) to the signal conversion device 1500, are the same physical or mechanical connectors that are used in conventional apparatuses to connect the IMM (or machine controller MC) to the DCVs of a conventional apparatus as described with reference to FIG. 10.

As shown in FIGS. 10, 11, 12 the signal output VS of the IMM can be connected directly to signal converter 1500 which converts the VS signal into a motor open close power signal MOPCS or a proportional directional control valve signal PDCVS that is compatible with and processable by the motors 940e, 941e, 942e or the proportional directional control valves V, V1, V2. Alternatively, the signal output of the IMM of the machine controller MC of the FIG. 10, 11, 12 embodiment can comprise a barrel screw position signal SPS that is sent to an intermediate HPU unit by a screw position sensor SPSR.

The MOCPS and PDCVS signals include signals that correspond to the VS signals that operate to affect the beginning and end of an injection cycle.

Typically the FIG. 10 apparatus 10 includes one or more position sensors, 950, 951, 952 or other sensors, SN, SC that detect a selected condition of the injection fluid 18 in one or more of the manifold fluid flow channel 19, a nozzle flow channel 42, 44, 46 or in the cavity 30 of the mold 33.

The actuator controller 16 can include a program that receives and processes a real time signal indicative of a condition of the injection fluid 18 or a component of the apparatus (10) such as rotational position of a rotor 940r, 941r, 942r or axial linear position of a valve pin 1040, 1041, 1042. The real time signals sent to and received by the actuator controller 16 are generated by one or more of position sensors 950, 951, 952 or fluid condition sensors SN, SC. The sensors detect and send a signal to the actuator controller that is typically indicative of one or more of rotational position (sensors 950, 951, 952) of a rotor 940r, 941r, 942r or of linear axial position of a valve pin 1040, 1041, 1042. The fluid condition sensors typically comprise one or more of a pressure or temperature sensor SN that senses injection fluid 18 within a manifold channel 19 or a nozzle channel 42, 44, 46 or senses pressure or temperature of the injection fluid SC within the cavity 30 of the mold 33.

The actuator controller 16 can include a program that processes the received signal(s) from one or more of the sensors 950, 951, 952, SN, SC according to a set of instructions that use the received signals as a variable input or other basis for controlling one or more of the position or velocity of the actuators 940e, 941e, 942e or their associated valve pins 1040, 1041, 1042 throughout all or selected portion of the duration of an injection cycle or all or a portion of the length of the upstream or downstream stroke of the actuators 940e, 941e, 942e.

As shown the controller 16 can be included within and comprise a component of the converter 1500, FIGS. 10, 11, 12. Where the converter 1500 includes a controller 16 that includes position and velocity control instructions, the converter 1500 can thus send its machine open close power signals MOCPS (or valve open close signals PDCVS) together with position velocity signals (PVS) to either the electric actuators 940e, 941e, 942e or proportional directional control valves V, V1, V2. The control signals MOCPS and PDCVS thus include a signal that has been converted from and corresponds to one or the other of the converted VS signals received by the converter 1500 from the IMM controller MC or the HPU. The position or velocity control signals PVS can control the position or velocity of the valve pin according to any predetermined profile of pin position or velocity versus time of injection cycle. The form, format, intensity and frequency of the MOCPS, PDCVS and PVS signals are compatible with the signal receiving interface of the electric actuators 940e, 941e, 942e or valves V, V1, V2.

What is claimed is:

1. An injection molding apparatus, comprising:
   a heated manifold arranged to receive injection fluid from an injection molding machine and further arranged to distribute the injection fluid to a flow channel that delivers the injection fluid to a gate of a mold cavity;
   an electrical drive having an interface arranged to receive and controllably distribute electrical energy in controllably varied amounts during the course of an injection cycle; and
   an actuator, the actuator having:
      a rotor having a drive axis (Y);
      a driver interconnected to the rotor and adapted to controllably drive the rotor rotatably around the drive axis Y, wherein the driver is arranged to receive the electrical energy from the electrical drive; and
      a housing that houses the rotor and the driver,
   wherein the housing is adapted to support the rotor,
   wherein the electrical drive is housed within the housing or mounted on or to the housing, and
   wherein the housing is in heat communication or contact with the heated manifold.

2. An injection molding apparatus, comprising: a heated manifold arranged to receive injection fluid from an injection molding machine and further arranged to distribute the injection fluid to a flow channel that delivers the injection fluid to a gate of a mold cavity;
   an electrical drive having an interface arranged to receive and controllably distribute electrical energy in controllably varied amounts during the course of an injection cycle; and
   an actuator, the actuator having:
      a rotor or shaft having a drive axis (Y);
      a driver interconnected to the rotor or shaft and adapted to controllably drive the rotor or shaft rotatably around the drive axis Y, wherein the driver is arranged to receive the electrical energy from the electrical drive; and
      a housing that houses the rotor or shaft and the driver, wherein the electrical drive is housed within the housing or mounted on or to the housing in thermally conductive communication or contact therewith,
   wherein one or the other or both of the housing and the electrical drive is in heat communication or contact with the heated manifold.

3. An apparatus according to claim 2 wherein the driver includes one or more of a stator and armature that are interconnected to the rotor or shaft such that when the driver rotates on application and receipt of electrical energy, the rotor or shaft is rotated.

4. An apparatus according to claim 2 wherein the electrical drive is arranged to receive electrical energy from a power source and controllably distribute at least a portion of the received electrical energy in controllably varied amounts during an injection cycle to the driver.

5. An apparatus according to claim 2 wherein the heat communication or contact with the heated manifold is an indirect heat communication or contact with the heated manifold.

6. An apparatus according to claim 2 wherein the heat communication or contact with the heated manifold is a direct heat communication or contact with the heated manifold.

7. An apparatus according to claim 6 wherein the housing and the electrical drive are mounted on or to mounts formed, at least in part, of a metal material, said mounts being mounted in direct metal to metal contact or communication with the heated manifold.

8. An apparatus according to claim 2 wherein the electrical drive includes a pulse-width modulator (PWM) arranged to convert received electrical energy into a reciprocating voltage waveform signal, the reciprocating voltage waveform signal being adapted to drive a corresponding phase-coil of the actuator driver.

9. An apparatus according to claim 8 wherein the pulse-width modulator (PWM) includes at least one of an inverter and a comparator.

10. An apparatus according to claim 8 wherein the pulse width modulator (PWM) includes a three-phase inverter arranged to convert electrical energy received via the interface into three reciprocating voltage waveforms, each one of the three reciprocating voltage waveforms adapted to drive a corresponding one of three phase-coils of the actuator driver.

11. An apparatus according to claim 8 wherein at least some electrical energy received at or by the pulse width modulator (PWM) has a DC bus voltage.

12. An apparatus according to claim 2, further comprising:
   a controller arranged to provide one or more control signals to the interface of the electrical drive, wherein the interface of the electrical drive is is arranged to convert electrical energy received from a power source (PS) into a reciprocal waveform signal based on the one or more control signals.

13. An apparatus according to claim 12 wherein the interface includes a pulse width modulator (PWM) arranged to convert electrical energy received from the power source into a reciprocal waveform signal based on the one or more control signals.

14. An apparatus according to claim 13 wherein the one or more control signals received at the interface contain control information arranged to cause the pulse width modulator (PWM) to convert received electrical energy into three reciprocating voltage waveform signals, each reciprocating voltage waveform signal adapted to drive a corresponding one of three phase-coils of the actuator driver to adjust one or more of a position, a velocity, or torque of the actuator rotor or shaft.

15. An apparatus according to claim 12 wherein the one or more control signals include at least some analog electrical signals.

16. An apparatus according to claim 12, further comprising:
   a communication device, the communication device including one or both of a transmitter and a receiver, wherein the communication device is adapted to communicate digital signals between the electrical drive and the controller, and wherein the digital signals include at least some of the one or more control signals provided by the controller.

17. An apparatus according to claim 16 wherein the one or more control signals include one or more of differential position commands, differential current commands, and differential velocity commands.

18. An apparatus according to claim 16 wherein the communication device is adapted to receive digital signals from the actuator, said digital signals including one or more feedback signals corresponding to operation of one or more of the actuator and the actuator rotor or shaft, wherein the interface includes a pulse width modulator (PWM) arranged to convert the electrical energy from the power source into reciprocating voltage waveform signals adapted to drive a corresponding one of three phase-coils of the driver based at least in part on the one or more feedback signals.

19. An apparatus according to claim 18 wherein the one or more feedback signals include one or more of an incremental feedback signal and an absolute feedback signal.

20. An apparatus according to claim 2, further comprising:
a linear travel converter interconnected to the actuator housing in an arrangement wherein a valve pin is adapted to be driven along a linear axis (X) that is non-coaxial relative to the drive axis (Y), the linear travel converter being mounted on or to or disposed in heat conductive communication with the heated manifold.

21. An apparatus according to claim 20, further comprising:
a clamping plate, wherein the linear travel converter is mounted on or to one or the other or both of the heated manifold and the clamping plate.

22. An apparatus according to claim 21, further comprising:
a converter housing arranged to at least partially encase the linear travel converter, wherein the converter housing is mounted in direct or indirect heat conductive contact to one or both of the heated manifold and the actuator housing.

23. An apparatus according to claim 20, further comprising:
a converter housing arranged to at least partially encase the linear travel converter, wherein the converter housing is mounted on or to mounts formed, at least in part, of a metal material, said mounts being mounted in direct metal to metal contact or communication with the heated manifold.

24. An apparatus according to claim 23, further comprising:
a clamping plate, wherein the converter housing is mounted on or to the clamping plate in an arrangement such that one or the other or both of the converter housing and the electrical drive are in substantial heat or thermal communication with the heated manifold.

25. An injection molding method, comprising:
injecting, with an injection molding machine, a flow of injection fluid to a heated manifold;
distributing the injection fluid via the heated manifold to a flow channel; and
during an injection cycle, delivering the injection fluid to a gate of a mold cavity, said delivering including acts of:

controllably driving a rotor of an actuator around a drive axis (Y) of the rotor with a driver interconnected to the rotor;
receiving, at the driver, electrical energy from an electrical drive;
receiving and controllably distributing, via an interface of the electrical drive, electrical energy in controllably varied amounts during the course of the injection cycle to the driver;
converting, with a pulse-width modulator (PWM) of the electrical drive, received electrical energy into reciprocal voltage, waveform signals;
driving, with each reciprocal voltage waveform signal, a corresponding phase-coil of the actuator driver; and
supporting the rotor with a housing that houses the actuator, the rotor, and the driver such that the rotor is drivably rotatable, wherein the electrical drive is housed within the housing or mounted on or to the housing, and wherein one or the other or both of the housing and the electrical drive are in communication or contact with the heated manifold.

26. An apparatus according to claim 2, further comprising:
a clamping plate; and
a mount formed, at least in part, of a thermally conductive material, the mount having first and second heat conductive surfaces disposed between the clamping plate and the actuator housing, wherein a surface of the actuator housing is mounted in direct or indirect thermal communication with the first heat conductive surface,
wherein a surface of the clamping plate is mounted in direct or indirect thermal communication with the second conductive surface, and
wherein the second conductive surface of the mount is adapted to be urged into compressed thermally conductive contact or communication with the surface of the clamping plate.

27. An apparatus according to claim 26 wherein the mount includes a resiliently compressible spring disposed between the actuator housing and the clamping plate, said resiliently compressible spring being adapted to urge the second conductive surface of the mount into the compressed thermally conductive contact or communication with the surface of the clamping plate.

28. An apparatus according to claim 27 wherein the resiliently compressible spring includes one or more resiliently compressible arms that are resiliently bendable and that have an actuator engagement surface adapted to engage a complementary surface of the actuator housing, wherein the resiliently compressible spring, the mount, and the clamping plate are arranged such that the one or more resiliently compressible arms bend when the actuator housing, mount, and clamping plate are assembled and when the manifold is brought to an operating temperature to cause the actuator engagement surface to compressibly engage the complementary surface and to urge the second heat conductive surface of the mount into compressed thermally conductive contact or communication with the surface of the clamping plate.

29. A method according to claim 25, further comprising:
generating, with a machine controller or a control unit of the injection molding machine, one or more directional control valve compatible signals that are compatible for use by a signal receptor, interface, or driver of a standard fluid directional control valve;

receiving, at a signal converter that is interconnected to the machine controller or control unit, the one or more directional control valve compatible signals;

converting the directional control valve compatible signals to a command signal that is compatible with a signal receptor or interface of an electrically powered actuator or a signal receptor or interface of a proportional directional control valve that drives a fluid driven actuator; and further converting, with a processor, the command signals into a form, frequency, power, or format that is usable by the signal receptor or interface of the electrically powered actuator or by the signal receptor or interface of the proportional directional control valve to respectively cause the electrically powered actuator or the proportional directional control valve to be driven in a direction that operates to either begin the injection cycle or to end the injection cycle.

30. A method according to claim 29 wherein the directional control valve compatible signals include a voltage signal of predetermined voltage or magnitude indicative of a predetermined rotational position of a barrel screw of the injection molding machine.

31. A method according to claim 2 further comprising:
generating, via one or more sensors, one or more sensor signals indicative of one or more of a detected rotational or linear position of the actuator or an associated valve pin, pressure or temperature of the injection fluid within a fluid channel of the heated manifold or within a nozzle channel or within the mold cavity or within a barrel of the injection molding machine;
receiving at an actuator controller the one or more sensor signals; and
via a program associated with the actuator controller:
instructing the actuator or its associated valve pin to travel during the injection cycle to positions that correspond to a predetermined profile of injection fluid pressures, linear or rotational actuator or valve pin positions, barrel screw positions, barrel pressures or actuator drive fluid pressures; or
instructing the actuator or its associated valve pin to withdraw the valve pin from a closed gate position upstream at a reduced velocity over a selected path of upstream travel; or
instructing the actuator or its associated valve pin to travel such that the valve pin is driven downstream at a reduced velocity over a selected path of travel where a distal tip end of the valve pin travels from upstream of the gate to a gate closed position; or
instructing the actuator or its associated valve pin to travel such that the valve pin is driven upstream or downstream to an intermediate position between a gate closed position and a fully upstream position where the valve pin is maintained in the intermediate position for a selected period of time during the injection cycle wherein, in the intermediate position, the distal tip end of the valve pin restricts flow of injection fluid to less than a maximum flow.

32. An apparatus according to claim 2 wherein the electrical drive is housed or mounted within, on, or to a thermally conductive housing body, that is readily attachable to and detachable from the actuator housing, the readily attachable and detachable housing body being attachable or mountable to the actuator housing in an arrangement such that the electrical drive is in direct thermally conductive contact or communication with the actuator housing when attached.

33. An apparatus according to claim 2, further comprising:
at least one valve pin having a tip end communicatively coupled to the actuator, the valve pin being controllable by the actuator to move upstream along a path of travel between a downstream gate closed position and one or more intermediate upstream gate open positions, the downstream gate closed position being a position wherein the tip end of the valve pin obstructs the gate to prevent the injection fluid from flowing into the mold cavity, the one or more intermediate upstream gate open positions being predetermined positions between the downstream gate closed position and an end of stroke position upstream of the intermediate upstream gate open positions, wherein the gate is partially open when the valve pin is in the one or more intermediate upstream gate open positions and the gate is more fully open when the valve pin is in the end of stroke position;
a position sensor arranged to sense a position of the valve pin or the actuator;
a controller arranged to execute instructions that instruct the actuator to drive the valve pin:
upstream at one or more selected intermediate velocities over the path of travel of the valve pin through the one or more intermediate upstream gate open positions in response to receipt by the controller of a signal from the position sensor that the valve pin is disposed in the one or more intermediate upstream gate open positions, and
upstream at a higher upstream velocity than the one or more selected intermediate velocities during the course of upstream travel of the valve pin between the one or more intermediate upstream gate open positions and the end of stroke (EOS) position.

34. The apparatus of claim 33, further comprising:
a second valve pin having a second tip end;
a second actuator communicatively coupled to the second valve pin, the second actuator arranged to receive instructions from the controller to drive the second valve pin upstream along a second path of travel between a second downstream gate closed position, one or more second intermediate upstream gate open positions, and a second end of stroke position at which the injection fluid flows at a selected maximum rate through a second gate, the second downstream gate closed position being a position wherein the second tip end of the second valve pin obstructs the second gate to prevent the injection fluid from flowing into the mold cavity, the one or more second intermediate upstream gate open positions being predetermined positions between the second downstream gate closed position and the second end of stroke position;
a second position sensor arranged to sense a position of the second valve pin or the second actuator, wherein the controller is further arranged to execute second instructions that instruct the second actuator:
to open the second gate after the injection fluid has been injected through the gate and flowed downstream through the mold cavity and, to drive the second valve pin upstream at one or more selected second intermediate velocities over the second path of travel of the second valve pin through the one or more second intermediate upstream gate open positions in response to a first signal from the second position sensor that the second valve pin is disposed in a selected second intermediate upstream gate open position, and to drive the second valve pin at a second higher velocity than the one or more selected second intermediate velocities in response a second signal from the second position sensor that the second valve pin is disposed in the selected second intermediate upstream gate open position.

35. An apparatus according to claim 34 wherein the controller is still further arranged to execute third instructions that instruct the second actuator to open the second gate after the injection fluid injected through the gate has flowed downstream through the mold cavity past the second gate.

36. A method of performing an injection molding cycle comprising operating the apparatus of claim 2 to perform an injection cycle.

37. A method of performing an injection molding cycle comprising operating the apparatus of claim 1 to perform an injection cycle.

* * * * *